(12) United States Patent
Ikenaka

(10) Patent No.: US 7,206,274 B2
(45) Date of Patent: Apr. 17, 2007

(54) CONVERGING OPTICAL SYSTEM OF OPTICAL PICKUP DEVICE

(75) Inventor: Kiyono Ikenaka, Hino (JP)

(73) Assignee: Konica Minolta Holdings, Inc., Tokyo (JP)

( * ) Notice: Subject to any disclaimer, the term of this patent is extended or adjusted under 35 U.S.C. 154(b) by 565 days.

(21) Appl. No.: 10/809,424

(22) Filed: Mar. 26, 2004

(65) Prior Publication Data

US 2004/0190426 A1    Sep. 30, 2004

(30) Foreign Application Priority Data

Mar. 31, 2003    (JP)    .............................. 2003-094403

(51) Int. Cl.
    *G11B 7/00*    (2006.01)

(52) U.S. Cl. ................................................. 369/112.01

(58) Field of Classification Search .......... 369/112.01, 369/112.12, 112.02, 112.08, 112.26, 44.23, 369/44.24, 120, 121, 94, 112.23

See application file for complete search history.

(56) References Cited

U.S. PATENT DOCUMENTS 6,870,805 B1 *    3/2005    Arai et al. ............. 369/112.07

* cited by examiner

*Primary Examiner*—Nabil Hindi
(74) *Attorney, Agent, or Firm*—Finnegan, Henderson, Farabow, Garrett & Dunner, L.L.P.

(57) ABSTRACT

A light converging optical system for use in an optical pickup apparatus which conducts reproducing and/or recording information for a first optical information recording medium and a second optical information recording medium using light fluxes emitted by a first light source and a second light source respectively, includes an objective optical element being a single lens; a first optical element being a single lens; and a phase difference giving structure formed on at least one optical surface of optical surfaces of the objective optical element and the first optical element and for giving a phase difference, the phase difference giving structure having a chromatic aberration correcting function for correcting a chromatic aberration in such a way that when the wavelength of a light flux emitted from the first light source varies, the phase difference giving structure corrects a varied aberration quantity before and after the wavelength variation.

60 Claims, 12 Drawing Sheets

FRONT ◄──────► REAR

FRONT ← → REAR

CD LONGITUDINAL SPHERICAL ABERRATION DIAGRAM

EXAMPLE 1    AOD LONGITUDINAL SPHERICAL ABERRATION DIAGRAM

EXAMPLE 1 DVD LONGITUDINAL SPHERICAL ABERRATION DIAGRAM

EXAMPLE 2  AOD LONGITUDINAL SPHERICAL ABERRATION DIAGRAM

EXAMPLE 2    DVD LONGITUDINAL SPHERICAL ABERRATION DIAGRAM

EXAMPLE 2 CD LONGITUDINAL SPHERICAL ABERRATION DIAGRAM

CONVERGING OPTICAL SYSTEM OF OPTICAL PICKUP DEVICE

BACKGROUND OF THE INVENTION

The present invention relates to a converging optical system of an optical pickup device.

There have recently been advanced research and development for the so-called high density optical disc wherein recording density of an optical information recording medium (optical disk) has been enhanced by using a blue laser beam with a wavelength of about 400 nm, and a storage capacity has been increased accordingly.

As a standard of the high density optical disc, there are known, for example, those in which an image-side numerical aperture (NA) of an objective lens is made to be about 0.85 and a protective base board thickness is made to be about 0.1 mm and those in which NA and a protective base board thickness are controlled respectively to be about 0.65 and about 0.6 mm which are similar to those of conventional DVD (digital video disc). In the following explanation, a high density optical disc having NA of about 0.65 and a protective base board thickness of about 0.6 mm is expressed as "AOD (Advanced Optical Disc)".

There are proposed various technologies about an optical pickup device which has compatibility for the high density optical disc stated above and an optical disc which has been used widely such as DVD (digital video disc) and CD (compact disc) (for example, see Patent Document 1).

In the optical pickup device, in this case, there is caused a problem that a position of a converging spot formed on an optical axis is deviated from an information recording surface of an optical disc, if, for example, the so-called mode hop representing instantaneous fluctuation of a wavelength of a light flux takes place when power of the light flux emitted from a light source is enhanced. Therefore, it is necessary to conduct correction (hereinafter referred to as "mode hop correction") of lens characteristics (wavelength characteristics) for the wavelength fluctuation, by providing, for example, a diffractive structure on an optical surface of an objective lens representing a single lens.

Incidentally, the mode hop correction means correction to correct aberration in a converging spot (aberration in combination of axial chromatic aberration and spherical chromatic aberration) around the wavelength fluctuation to be the diffraction limit or less.

On AOD, in particular, there is a problem that a position of the converging spot deviates greatly, because NA is as relatively large as about 0.65 and a wavelength of a light flux is as short as about 400 nm, and thereby, an amount of fluctuation of the wavelength in the case of mode hop is great.

Further, though an objective lens is made of plastic that is light in weight, low in price and is high in processability in many cases, there is caused a problem that spherical aberration is caused by temperature rise in the direction toward excessiveness, because plastic has a special character that a refractive index is changed by temperature changes. Therefore, for the purpose of improving the characteristic (temperature characteristic) of a lens for temperature changes, there is an occasion, for example, wherein spherical aberration caused by temperature rise in the direction toward excessiveness is cancelled by providing a diffractive structure on an optical surface of an objective lens representing a single lens and by generating spherical aberration in the direction toward insufficiency with the diffractive structure.

Further, there are some cases where a wavelength of an emitted light flux for each light source is different from others because of individual differences in light sources. Therefore, the axial chromatic aberration is corrected by moving a position of the objective lens representing a single lens in the optical axis direction relatively to an optical information recording medium by the use of an actuator, and the spherical chromatic aberration is corrected by using the diffractive structure provided on an optical surface of the objective lens representing a single lens. Incidentally, for environmental changes other than instantaneous changes such as mode hop, a position of an information recording surface of the optical information recording medium in the optical axis direction is usually adjusted to the position where a wavefront aberration of a converging spot is minimum, by moving the objective lens relatively to the optical information recording medium by the use of an actuator as stated above.

In the optical pickup device having compatibility for converging two light fluxes having respectively wavelength $\lambda 1$ and wavelength $\lambda 2$ on optical discs each being different from the other, a diffractive structure is provided on a part of an optical surface of an objective lens representing a single lens, for example, to make the light flux with wavelength $\lambda 2$ passing through the diffractive structure to be flares to make the structure prohibiting light converging on an optical disk, and thereby, to provide a function (function to restrict an aperture) that restricts a numerical aperture of the objective lens for a light flux with wavelength $\lambda 2$, and the diffracted light of the order that makes the diffraction efficiency to be highest among light fluxes with wavelength $\lambda 1$ and with wavelength $\lambda 2$ which are subjected to diffracting effect by the diffractive structure is utilized, and thereby, light utilizing efficiency is enhanced and an amount of light that is sufficient for conducting recording and/reproducing of information is obtained.

By providing a diffractive structure on an optical surface of the objective lens representing a single lens, as has been done, as stated above, technical problems such as improvement of light utilizing efficiency, improvement of wavelength characteristics and temperature characteristics and securing of a function to restrict an aperture have been solved.

(Patent Document 1)
TOKKAI No. 2001-93179

(Problems to be Solved by the Invention)

However, there is a problem that it is difficult for the diffractive structure provided on the objective lens representing a single lens alone to solve all of the aforementioned technical problems, because the degree of freedom for the design of the objective lens is lowered.

Further, in the Patent Document 1, there is disclosed a technology to use an objective lens unit wherein a condenser lens and a diffractive optical element are combined, and by using diffracted light of two types of light fluxes (first beam of light and second beam of light) which pass through the objective lens unit, aberrations are controlled, and thereby, an optical pickup device that is suitable for downsizing can be provided.

However, when using a plane concave lens disclosed in the Patent Document 1 as the diffractive optical element, the refracting power of the plane concave lens is weaker than that of a convex lens and refracting power of the total objective lens unit is also weak, which causes a fear that an effect to correct spherical aberration by using refracting power cannot be obtained sufficiently.

SUMMARY OF THE INVENTION

Taking the aforementioned problem into consideration, an object of the invention is to provide a converging optical system which has compatibility for AOD and other optical information recording medium and can control spherical aberration.

To solve the aforesaid problem, the structure described in Item 1 is a converging optical system used in an optical pickup device that conducts reproducing and/or recording of information for the first optical information recording medium by converging a light flux with wavelength λ1 (350 nm) ≦λ1≦450 nm) emitted from at least the first light source on an information recording surface of the first optical information recording medium having protective base board thickness t1 (0.5 mm≦t1≦0.7 mm) and by converging a light flux with wavelength λ2 (650 nm≦λ2≦700 nm) emitted from the second light source on an information recording surface of the second optical information recording medium having protective base board thickness t2 (0.5 mm≦t2≦0.7 mm), wherein there are provided an objective optical element representing a single lens arranged just in front of an information recording surface of each optical information recording medium to face the information recording surface light-source-side optical surface and the first optical element representing a single lens arranged just in front of a light-source-side optical surface of the objective optical element to face the optical surface, and a phase difference providing structure that provides a phase difference to the light flux with wavelength λ1 is formed on at least one optical surface among optical surfaces of the objective optical element and the first optical element, while, the phase difference providing structure has a color correcting function that corrects an amount of aberration fluctuation at the same position in the optical axis direction, before and after the wavelength fluctuation in the case when a wavelength of the light flux emitted from the first light source is changed by 1 nm from λ1, to 0.03 λ rms or less.

DETAILED DESCRIPTION OF THE PREFERRED EMBODIMENT

Figure 1:
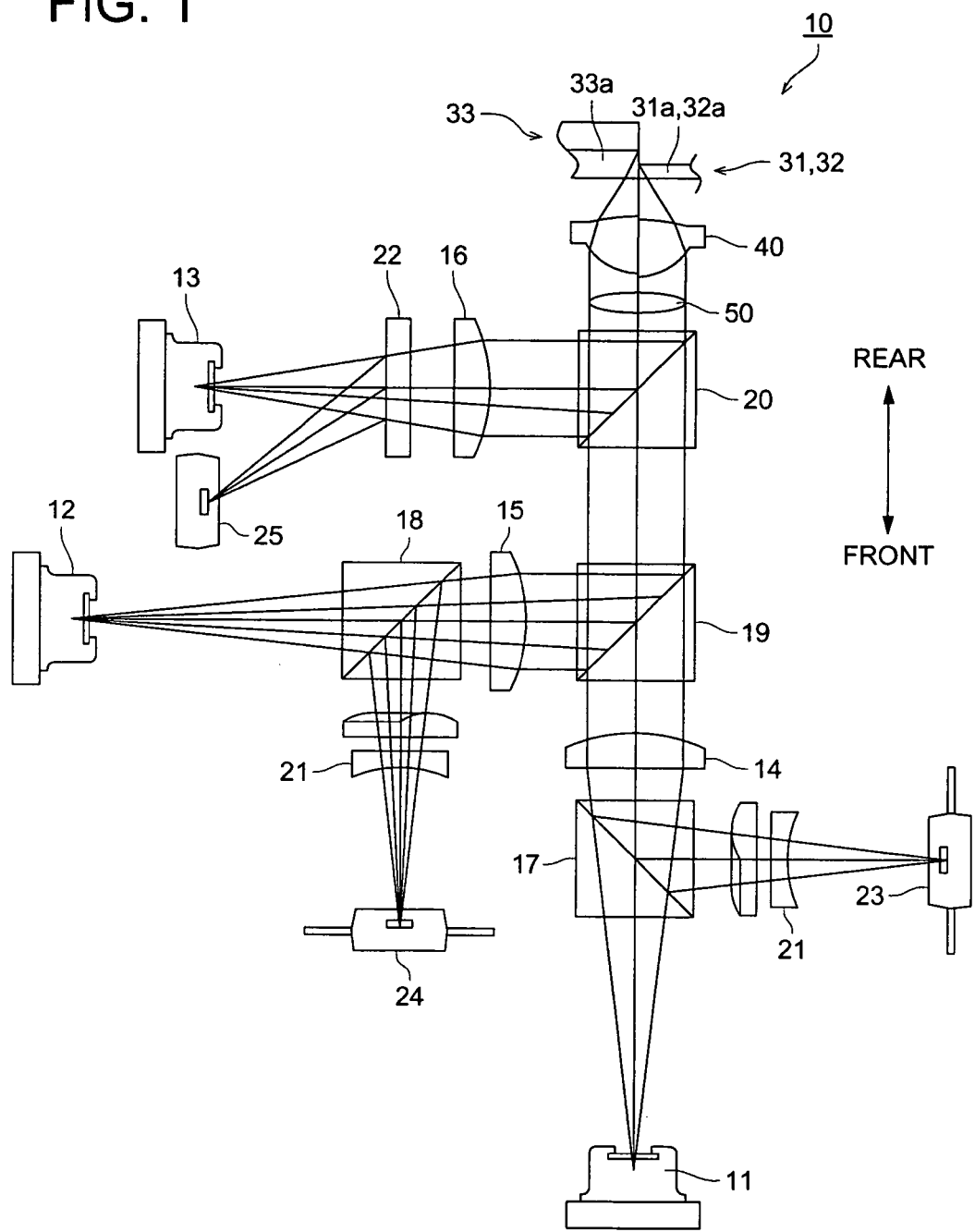
FIG. 1 is a top view of primary portions showing constitution of an optical pickup device.

Hereinafter, the preferable structures according to the invention will be explained.

The structure described in Item 2 is the converging optical system described in Item 1, wherein the aforementioned phase difference providing structure is formed on the light-source-side optical surface of the first optical element.

The structure described in Item 3 is the converging optical system described in Item 1 or Item 2, wherein there is provided a function to correct spherical aberration caused by a wavelength difference between a light flux with wavelength λ1 and a light flux with wavelength λ2.

The structure described in Item 4 is the converging optical system described in Item 3, wherein the function to correct spherical aberration caused by a wavelength difference between a light flux with wavelength λ1 and a light flux with wavelength λ2 is attained by combining a refracting power owned by the optical surface of the objective optical element and a refracting power owned by the optical surface of the first optical element.

The structure described in Item 5 is the converging optical system described in either one of Items 1–4, wherein at least one of optical surfaces of the first optical element is a convex surface.

The structure described in Item 6 is the converging optical system described in either one of Items 1–5, wherein optical system magnification ml of the objective optical element for the light flux with wavelength λ1 and optical system magnification m2 for the light flux with wavelength λ2 satisfy m1=0 and m2=0.

The structure described in Item 7 is the converging optical system described in Item 6, wherein the phase difference providing structure is a diffractive structure, and nth (n is a natural number) order diffracted light that is caused when a phase difference is provided to the light flux with wavelength λ1 by the phase difference providing structure is converged on an information recording surface of the first optical information recording medium.

The structure described in Item 8 is the converging optical system described in Item 7, wherein n is 5.

The structure described in Item 9 is the converging optical system described in Item 7, wherein n is 8.

The structure described in Item 10 is the converging optical system described in either one of Items 1–5, wherein optical system magnification ml of the objective optical element for the light flux with wavelength λ1 and optical system magnification m2 for the light flux with wavelength λ2 satisfy m1=0 and m2≠0.

The structure described in Item 11 is the converging optical system described in Item 10, wherein the phase difference providing structure is a diffractive structure, and $n^{th}$ (n is a natural number) order diffracted light that is caused when a phase difference is provided to the light flux with wavelength λ1 by the phase difference providing structure is converged on an information recording surface of the first optical information recording medium.

The structure described in Item 12 is the converging optical system described in Item 11, wherein n is 5.

The structure described in Item 13 is the converging optical system described in Item 11, wherein n is 8.

The structure described in Item 14 is the converging optical system described in either one of Items 1–13, wherein reproducing and/or recording of information for the third optical information recording medium is conducted when the optical pickup device converges a light flux with wavelength λ3 (750 nm≦λ3≦850 nm) emitted from the third light source on an information recording surface of the third optical information recording medium having protective base board thickness t3 (1.1 mm≦t3≦1.3 mm).

The structure described in Item 15 is the converging optical system described in Item 14, wherein optical system magnification m1 of the objective optical element for the light flux with wavelength λ1, optical system magnification m2 for the light flux with wavelength λ2 and optical system magnification m3 for the light flux with wavelength λ3 satisfy m1=0, m2=0 and m3=0.

The structure described in Item 16 is the converging optical system described in Item 15, wherein an optical surface where the phase difference providing structure is formed among optical surfaces of the objective optical element and the first optical element is divided into at least a central area including an optical axis and a peripheral area surrounding a circumference of the central area, and the light flux having wavelength λ3 which has passed through the central area is used for reproducing and/or recording of information for the third information recording medium, while, the light flux having wavelength λ3 which has passed through the peripheral area is not used for reproducing and/or recording of information for the third information recording medium, and the central area is divided into at least the first area and the second area, and the order of diffraction for the light flux with wavelength λ1 which is provided with a phase difference by the phase difference providing structure when passing through the first area and is converged on an information recording surface of the first information recording medium is an odd number, while, the order of diffraction for the light flux with wavelength λ1 which is provided with a phase difference by the phase difference providing structure when passing through the second area and is converged on an information recording surface of the first information recording medium is an even number.

The structure described in Item 17 is the converging optical system described in Item 16, wherein the first area and the second area are continued through a stepped surface along the optical axis direction.

The structure described in Item 18 is the converging optical system described in Item 16 or Item 17, wherein the first area and the second area each being one in number are formed on the central area.

The structure described in Item 19 is the converging optical system described in Item 18, wherein the first area is formed on an area including an optical axis.

The structure described in Item 20 is the converging optical system described in Item 18, wherein the second area is formed on an area including an optical axis.

The structure described in Item 21 is the converging optical system described in Item 14, wherein optical system magnification m1 of the objective optical element for the light flux with wavelength λ1, optical system magnification m2 for the light flux with wavelength λ2 and optical system magnification m3 for the light flux with wavelength λ3 satisfy m1=0, m2=0 and m3≠0.

The structure described in Item 22 is the converging optical system described in Item 21, wherein an optical surface where the phase difference providing structure is formed among optical surfaces of the objective optical element and the first optical element is divided into at least a central area including an optical axis and a peripheral area surrounding a circumference of the central area, and the light flux having wavelength λ3 which has passed through the central area is used for reproducing and/or recording of information for the third information recording medium, while, the light flux having wavelength λ3 which has passed through the peripheral area is not used for reproducing and/or recording of information for the third information recording medium, and the order of diffraction for the light flux with wavelength λ1 which is provided with a phase difference by the phase difference providing structure when passing through the central area and is converged on an information recording surface of the first information recording medium is an even number.

The structure described in Item 23 is the converging optical system described in Item 22, wherein the numbers for order of diffraction for the light flux with λ1 passing through the central area are 10, 8, 6 and 2.

The structure described in Item 24 is the converging optical system described in either one of Items 22 and 23, wherein the order of diffraction for the light flux with wavelength λ1 which is provided with a phase difference by the phase difference providing structure when passing through the peripheral area and is converged on an information recording surface of the first information recording medium is an odd number.

The structure described in Item 25 is the converging optical system described in either one of Items 22–24, wherein the light flux with wavelength λ3 passing through the peripheral area is provided with a phase difference by the phase difference providing structure to become flares, and is not converged on an information recording surface of the third information recording medium.

The structure described in Item 26 is the converging optical system described in either one of Items 22–25, wherein an optical element having the aperture restricting function that prevents the light flux with wavelength λ3 passing through the peripheral area from being converged on an information recording surface of the third optical information recording medium is arranged to face an optical surface of the thirst optical element closer to the light source.

The structure described in Item 27 is the converging optical system described in either one of Items 22–26, wherein at least one optical surface among optical surfaces of the objective optical element and the first optical element is coated thereon with a multilayer film having a wavelength selecting character which makes the light flux with wavelength λ1 and the light flux with wavelength λ2 to pass through and makes the light flux with wavelength λ3 to be reflected, and thereby, to prevent the light flux with wavelength λ3 from being converged on an information recording surface of the third optical information recording medium.

The structure described in Item 28 is the converging optical system described in either one of Items 22–27, wherein the optical pickup device is provided with a holo-laser unit in which a photodetector and the second light source are united integrally, and the light flux with wavelength λ2 reflected on the information recording surface of the second optical information recording medium traces, in its return travel, the same optical path as that in its outward travel, to arrive at a hologram element owned by the holo-laser unit where the course of the light flux is changed by the hologram element, and enters the photodetector.

The structure described in Item 29 is the converging optical system described in Item 14, wherein optical system magnification m1 of the objective optical system for the light flux with wavelength λ1, optical system magnification m2 for the light flux with wavelength λ2 and optical system magnification m3 for the light flux with wavelength λ3 satisfy m1=0, m2≠0 and m3≠0.

The structure described in Item 30 is the converging optical system described in Item 29, wherein m2=m3 is satisfied.

The structure described in Item 31 is the converging optical system described in Item 20, wherein the first light source and the second light source are united solidly.

The structure described in Item 32 is the converging optical system described in Item 29 or Item 30 wherein the optical pickup device is provided with a holo-laser unit in which a photodetector and the third light source are united integrally, and the light flux with wavelength λ3 reflected on the information recording surface of the third optical information recording medium traces, in its return travel, the same optical path as that in its outward travel, to arrive at a hologram element owned by the holo-laser unit where the course of the light flux is changed by the hologram element, and enters the photodetector.

The structure described in Item 33 is the converging optical system described in either one of Items 29–32 which is used in an optical pickup device capable of conducting reproducing and/or recording of information for the first optical information recording medium having therein the protective base board with thickness t1, the first information recording surface and the second information recording surface which are laminated in this order from the light source in the optical axis direction.

The structure described in Item 34 is the converging optical system described in either one of Items 1–33 wherein a distance from an optical surface of the objective optical element closer to an optical information recording medium to the surface of the protective base board of the first optical information recording medium is 1 mm or more.

The structure described in Item 35 is the converging optical system described in either one of Items 1–34 wherein a focal length of a compound system composed of the objective optical element and the first optical element is in a range of 2.0 mm–4.0 mm for the light flux with wavelength λ1.

The structure described in Item 36 is the converging optical system described in either one of Items 1–35 wherein an optical element having a color correcting function that corrects an amount of aberration fluctuation at the same position in the optical axis direction, before and after the wavelength fluctuation in the case when a wavelength of the light flux emitted from the second light source is changed by 1 nm from λ2 to 0.03 λ rms or less, is arranged at a location that is the optical path of the light flux with wavelength λ2 and is outside the optical path of the light flux with wavelength λ1.

The structure described in Item 37 is the converging optical system described in either one of Items 1–36 wherein the phase difference providing structure is composed of serrated ring-shaped zones or of a stepwise structure wherein a plurality of ring-shaped surfaces each having its center on the optical axis are continued through steps which are substantially in parallel with the optical axis, and the number of the diffractive ring-shaped zones or of the stepwise structures is in a range of 15–30.

The structure described in Item 38 is the converging optical system described in either one of Items 1–37 wherein Abbe's number of the objective optical element for the light flux with wavelength λ1 is different from that of the first optical element for the light flux with wavelength λ1.

The structure described in Item 39 is the converging optical system described in either one of Items 1–37 wherein Abbe's number of the objective optical element for the light flux with wavelength λ1 is the same as that of the first optical element for the light flux with wavelength λ1.

The structure described in Item 40 is the converging optical system described in Item 38 or Item 39 wherein a material of at least one optical element among the objective optical element and the first optical element is plastic.

The structure described in Item 41 is the converging optical system described in either one of Items 1–40 wherein relative positions of the objective optical element and the first optical element can be changes while the optical pickup device is driven.

The structure described in Item 42 is the converging optical system described in either one of Items 1–40 wherein relative positions of the objective optical element and the first optical element cannot be changed while the optical pickup device is driven.

The structure described in Item 43 is the converging optical system described in Item 42 wherein the objective optical element and the first optical element are connected physically each other.

The structure described in Item 44 is the converging optical system described in Item 42 or Item 43 wherein a distance from an optical surface of the first optical element to an optical surface of the objective optical element closer to the optical information recording medium is 3 mm or less.

(First Embodiment)

The first embodiment of a converging optical system of the invention will be explained as follows, referring to the drawings.

As shown in FIG. 1, in the present embodiment, optical pickup device 10 is provided with first light source 11, second light source 12 and third light source 13 which respectively emit a light flux with wavelength λ1 (350 nm≦λ1≦450 nm) a light flux with wavelength λ2 (650 nm≦λ2≦700 nm) and a light flux with wavelength λ3 (750 nm≦λ1≦850 nm).

The present embodiment is of the structure wherein compatibility is secured for three types of optical discs which conduct, by using each light flux, recording and/or reproducing of information respectively for first optical information recording medium 31 (AOD in the present embodiment) having protective base board 31a whose thickness is t1 (0.5 mm ≦t1≦0.7 mm), second optical information recording medium 32 (DVD in the present embodiment) having protective base board 32a whose thickness is t2 (0.5 mm≦t2≦0.7 mm) and third optical information recording medium 33 (CD in the present embodiment) having protective base board 33a whose thickness is t3 (1.1 mm≦t3≦1.3 mm). Incidentally, in FIG. 1, protective base board 31a of AOD 31 and protective base board 32a of DVD 32 which are substantially the same in terms of protective base board thickness (t1 and t2) are shown with the same diagram. Further, in FIG. 2 and FIG. 5, AOD 31, DVD 32 and CD 33 are shown by the same diagram for convenience.

Incidentally, the converging optical system relating to the invention is one to be used for compatibility between at least two types of optical discs of the first optical information recording medium 31 (AOD) and the second optical information recording medium 32 (DVD. Therefore, for the structure of the optical pickup device 10 for compatibility between AOD 31 and DVD 32, third light source 13, diffractive plate 22, third collimator lens 16, third photodetector 25, fourth beam splitter 20 and CD 32 have only to be removed from FIG. 1.

First, the structure of optical pickup device 10 will be explained.

As shown in FIG. 1, the optical pickup device 10 is schematically composed of first-third light sources 11–13, first-third collimator lenses 14–16, first-fourth beam splitters 17–20, objective lens 40 (objective optical element) representing a single lens arranged immediately before an information recording surface of each optical disc to face it, first optical element 50 representing a single lens arranged immediately before an optical surface (plane of incidence 41) of the objective lens closer to the light source to face it, a two-dimensional actuator (not shown) that moves the objective lens 40 and the first optical element 50 in the prescribed direction, concave lens 21, diffractive plate 22 and first-third photodetector 23–25.

Incidentally, "to arrange immediately before to face" means that the other optical elements are not present between the information recording surface and the objective lens 40 representing a single lens.

Incidentally, it is also possible to structure so that second photodetector 24 and second light source 12 may be united solidly or third photodetector 25 and third light source 13 may be united solidly, though an illustration of them is omitted, and to use a holo-laser unit wherein a light flux with wavelength λ2 or wavelength λ3 reflected on an information recording surface of DVD 32 or CD 33 traces, in its return travel, the same optical path as that in its outward travel, to arrive at a hologram element where the light flux is changed in terms of its optical path by the hologram element, and enters the photodetector.

In the present embodiment, a converging optical system is composed of first-third collimator lenses 14–16, first-fourth beam splitter 17–20, objective lens 40 and first optical element 50.

Further, the converging optical system is of the structure of an infinite system wherein each light flux having each of wavelength λ1–wavelength λ3 is made to be parallel light by each of first-third collimator lenses 14–16, to enter objective lens 40, namely, optical system magnification m1 of the objective lens 40 for the light flux with wavelength λ1, optical system magnification m2 for the light flux with wavelength λ2 and optical system magnification m3 for the light flux with wavelength λ3 satisfy m1=m2=m3=0.

Incidentally, it is possible to make each of light fluxes having respectively wavelength λ1–wavelength λ3 to enter objective lens 40 either as divergent light or as parallel light, dependent on design, and it is possible to employ, for example, the structure to make light fluxes having respectively wavelength λ2 and wavelength λ3 to enter the objective lens 40 as divergent light or the structure to make only light flux having wavelength λ3 to enter the objective lens 40 as divergent light.

Operations of the optical pickup device 10 structured as stated above are known well, and an explanation of them will be omitted here accordingly, and a light flux with wavelength λ1 emitted from the light source 11 passes through the first beam splitter 17 to be collimated by the first collimator lens 14, and passes through the third and fourth beam splitters 19 and 20 to arrive at the first optical element 50. On plane of incidence 51 of the first optical element 50, there is formed a diffractive structure as phase difference providing structure 60, and a light flux with wavelength λ1 is subjected to refraction functions on plane of incidence 51 and plane of emergence 52 of the first optical element 50 and is subjected to diffraction function on the plane of incidence 51 to enter objective lens 40, for which the detailed explanation will be given later.

Then, the light flux is subjected to refraction functions on plane of incidence 41 and plane of emergence 42 of the objective lens 40, and is converged on an information recording surface of AOD 31 to form a spot on optical axis L. Then, the light flux with wavelength λ1 converged to be a spot is modulated by information pit on the information recording surface to be reflected. The light flux thus reflected passes again through objective lens 40, first optical element 50, fourth and third beam splitters 20 and 19, and first collimator lens 14 and is reflected on the first beam splitter 17 to be branched.

Then, the light flux with wavelength λ1 thus branched passes through concave lens 21 and enters first photodetector 23. The first photodetector 23 detects a spot of incident light and outputs a signal, thus, the signal thus outputted is used to obtain a signal for reading information recorded in AOD.

Further, changes of an amount of light caused by changes in forms and locations of spots are detected on the first photodetector 23, for detections of focusing and tracking. Based on results of the detections, a two-dimensional actuator moves the objective lens 40 and the first optical element 50 integrally in the focusing direction and the tracking direction, so that a light flux with wavelength λ1 may form a spot accurately on an information recording surface.

Incidentally, an objective optical element and the first optical element 50 are physically connected to be united with the actuator, thus, the relative position for both of them remains unchanged in the course of driving by the actuator.

A light flux with wavelength λ2 emitted from the second light source 12 passes through second beam splitter 18 to be collimated by second collimator lens 15, then, is reflected by third beam splitter 19 and passes through fourth beam splitter 20 to arrive at the first optical element 50. Then, it is subjected to refraction functions on plane of incidence 51 and plane of emergence 52 of the first optical element 50 and is subjected to diffraction function on the plane of incidence 51 to enter objective lens 40.

Then, the light flux is subjected to refraction functions on plane of incidence 41 and plane of emergence 42 of the objective lens 40, and is converged on an information recording surface of DVD 32 to form a spot on the optical axis. Then, the light flux with wavelength λ1 converged to be a spot is modulated by information pit on the information recording surface to be reflected. The light flux thus reflected passes again through objective lens 40, first optical element 50 and fourth beam splitter 20, and is reflected on the third beam splitter 19 to be branched.

Then, the light flux with wavelength λ2 thus branched passes through second collimator lens 15 and is reflected on second beam splitter 18 to be branched, and it passes through concave lens 21 and enters second photodetector 24. Operations thereafter are the same as those in the light flux with wavelength λ1.

A light flux with wavelength λ3 emitted from third light source 13 passes through diffractive plate 22 provided in place of a beam splitter, and is collimated by third collimator lens 16, then, is reflected on fourth beam splitter 20 to arrive at the first optical element 50. Then, it is subjected to refraction functions on plane of incidence 51 and plane of emergence 52 of the first optical element 50 and is subjected to diffraction function on the plane of incidence 51, to enter objective lens 40.

Then, the light flux is subjected to refraction functions on plane of incidence 41 and plane of emergence 42 of the objective lens 40, and is converged on an information recording surface of CD 33 to form a spot on optical axis L. Then, the light flux with wavelength λ3 converged to be a spot is modulated by information pit on the information recording surface to be reflected. The light flux thus reflected passes again through objective lens 40 and first optical element 50 to be reflected on the fourth beam splitter 20 to be branched.

Then, the light flux with wavelength λ3 thus branched passes through third collimator lens 16 and is changed in terms of its way to advance while it passes through diffractive plate 22, and enters third photodetector 25. Operations thereafter are the same as those in the light flux with wavelength λ1.

Figure 2:
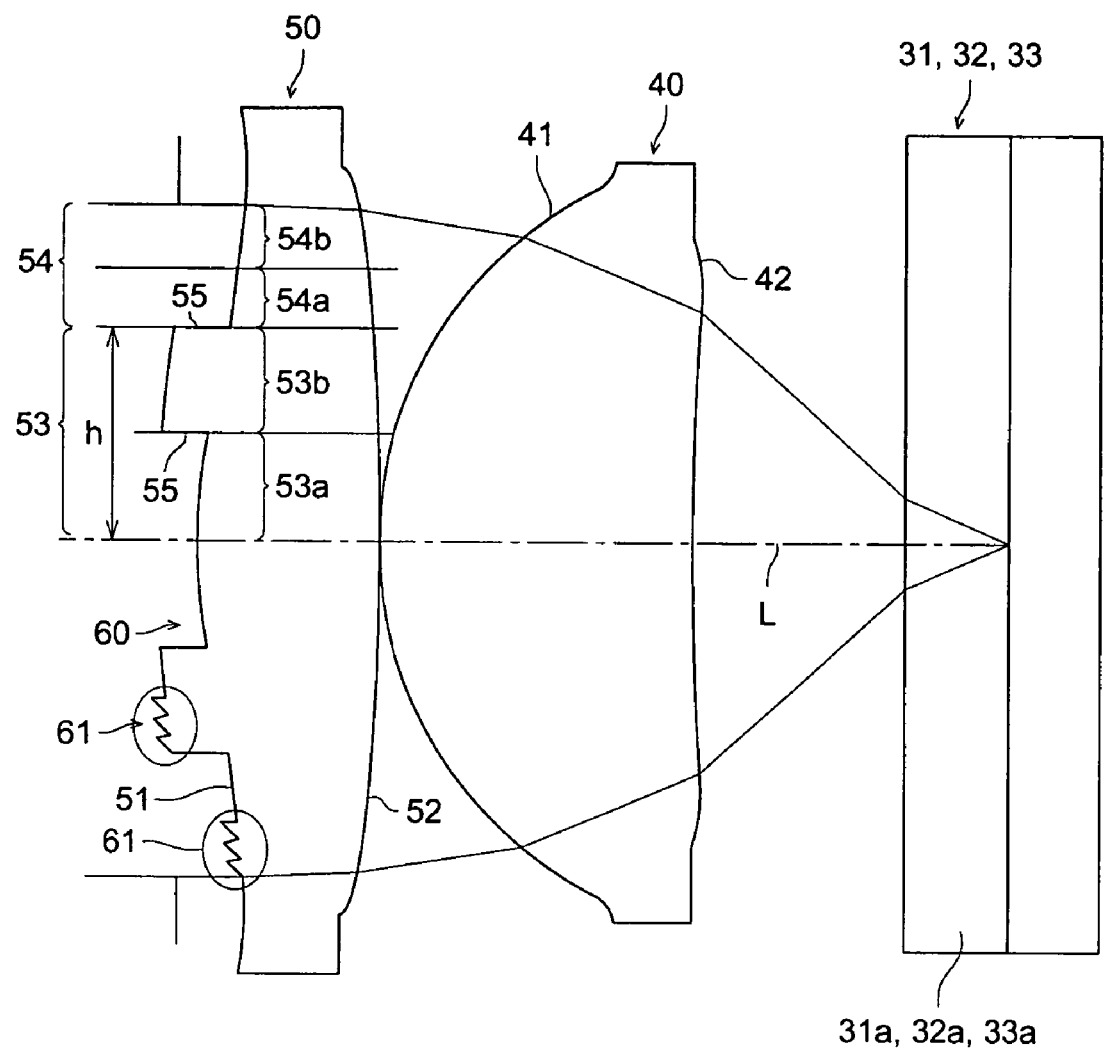
FIG. 2 is a lateral section of primary portions showing constitution of a first optical element and an objective lens.

As shown in FIG. 2, first optical element 50 is a single lens made of plastic wherein each of plane of incidence 51 and plane of emergence 52 is an aspheric surface and is convex.

On almost all area of the plane of incidence 51 of the first optical element 50, there is formed phase difference providing structure 60. Further, plane of emergence 52 of the first optical element 50 is a refracting interface.

In the present embodiment, the plane of incidence 51 is divided into central area 53 representing an area that includes optical axis L and has height h or less from the optical axis and peripheral area 54 that has height h or more from the optical axis and surrounds a circumference of the central area 53.

The central area 53 is formed on an area corresponding to a numerical aperture (0.45) of CD 33, and is further divided into first area 53a and second area 53b.

The second area 53b is formed to be projected forward from the first area 53a and from the peripheral area 54, and it is continued to the first area 53a and to the peripheral area 54 through step surface 55 that is in the direction of optical axis L. Incidentally, the second area 53b may also be formed to be retreated backward from the first area 53a and from the peripheral area 54.

On each of the central area 53 and the peripheral area 54, there are formed plural diffractive ring-shaped zones 61 (only a part is illustrated in FIG. 2) which are substantially in the form of concentric circles each having its center on the optical axis, as phase difference providing structure 60, and diffractive effect is given by the diffractive ring-shaped zones 61 to the light flux passing through the diffractive ring-shaped zones 61. Incidentally, explanation and illustration of a form of the diffractive ring-shaped zones 61 and a method of designing it are omitted here because they are well-known.

Light fluxes each having wavelength λ3 passing through central area 53 (first area 53a and second area 53b) are subjected to diffractive functions by the diffractive ring-shaped zones 61 of the central area 53, and a light flux having the prescribed number of diffraction among the light fluxes forms a light-converged spot on an information recording surface of CD 33, which is utilized for conducting recording and/or reproducing of information for CD 33.

On the other hand, a light flux with wavelength λ3 passing through peripheral area 54 is subjected to diffraction functions by the diffractive ring-shaped zones 61 of peripheral area 54 to be made flares, thus, the light flux does not form a light-converged spot on an information recording surface of CD 33, and is not used for conducting recording and/or reproducing of information for CD 33.

Light fluxes each having wavelength λ1 passing through first area 53a are subjected to diffractive functions by the diffractive ring-shaped zones 61 of first area 53a, and a diffracted light having the prescribed number of diffraction among the light fluxes forms a light-converged spot on an information recording surface of AOD 31, which is utilized for conducting recording and/or reproducing of information for AOD 31.

Light fluxes each having wavelength λ1 passing through second area 53b are also subjected to diffractive functions by the diffractive ring-shaped zones 61 of second area 53b, and a diffracted light having the prescribed number of diffraction among the light fluxes forms a light-converged spot on an information recording surface of AOD 31, which is utilized for conducting recording and/or reproducing of information for AOD 31.

Further, light fluxes each having wavelength λ1 passing through peripheral area 54 are also subjected to diffractive functions by the diffractive ring-shaped zones 61 of peripheral area 54, and a diffracted light having the prescribed number of diffraction among the light fluxes forms a light-converged spot on an information recording surface of DVD 32, which is utilized for conducting recording and/or reproducing of information for CD 33.

In this case, it is preferable that the order of diffraction for the light flux with wavelength λ1 which passes through first area 53a is made to be an odd number, and the order of diffraction for the light flux with wavelength λ1 which passes through second area 53b is made to be an even number.

Ordinarily, a blazed wavelength and an order for diffraction which make the diffraction efficiency to be the maximum are selected in many cases for diffracted light with wavelength λ1, because a light flux used for AOD 31 is under the condition that an amount of light of the light flux is high.

However, wavelength λ1 of the light flux used for AOD 31 is in a range of 350 nm–450 nm and wavelength λ3 of the light flux used for CD 33 is in a range of 750 nm –850 nm as stated above, which means that the wavelength λ1 is about a half of wavelength λ3. Thus, when nth order diffracted light with wavelength λ1 has the maximum diffraction efficiency, for example, $(n/2)^{th}$ order diffracted light of the light flux with wavelength λ3 has the maximum diffraction efficiency.

Further, since the wavelength λ2 for DVD 32 is about 1.5 times the wavelength λ1 for AOD 31, the diffraction order for the light flux with wavelength λ2 having the maximum diffraction efficiency is about 2/3 times that for wavelength λ1. If compatibility is performed with a ratio of the diffraction order between the wavelength λ1 and the wavelength λ2, diffracted order light with wavelength λ3 having the maximum diffraction efficiency has spherical aberration on an information recording surface of CD 33.

Therefore, when $6^{th}$ (even number) diffracted light among diffracted light with wavelength λ1 has the maximum diffraction efficiency, for example, if the diffraction order of the light flux with wavelength λ1 passing through the first area 53a and the diffraction order of the light flux with wavelength λ1 passing through the second area 53b are established to be $6^{th}$, the diffraction order of the light flux with wavelength λ3 passing through the first area 53a and the diffraction order of the light flux with wavelength λ3 passing through the second area 53b become 6/2=3.

Figure 3:
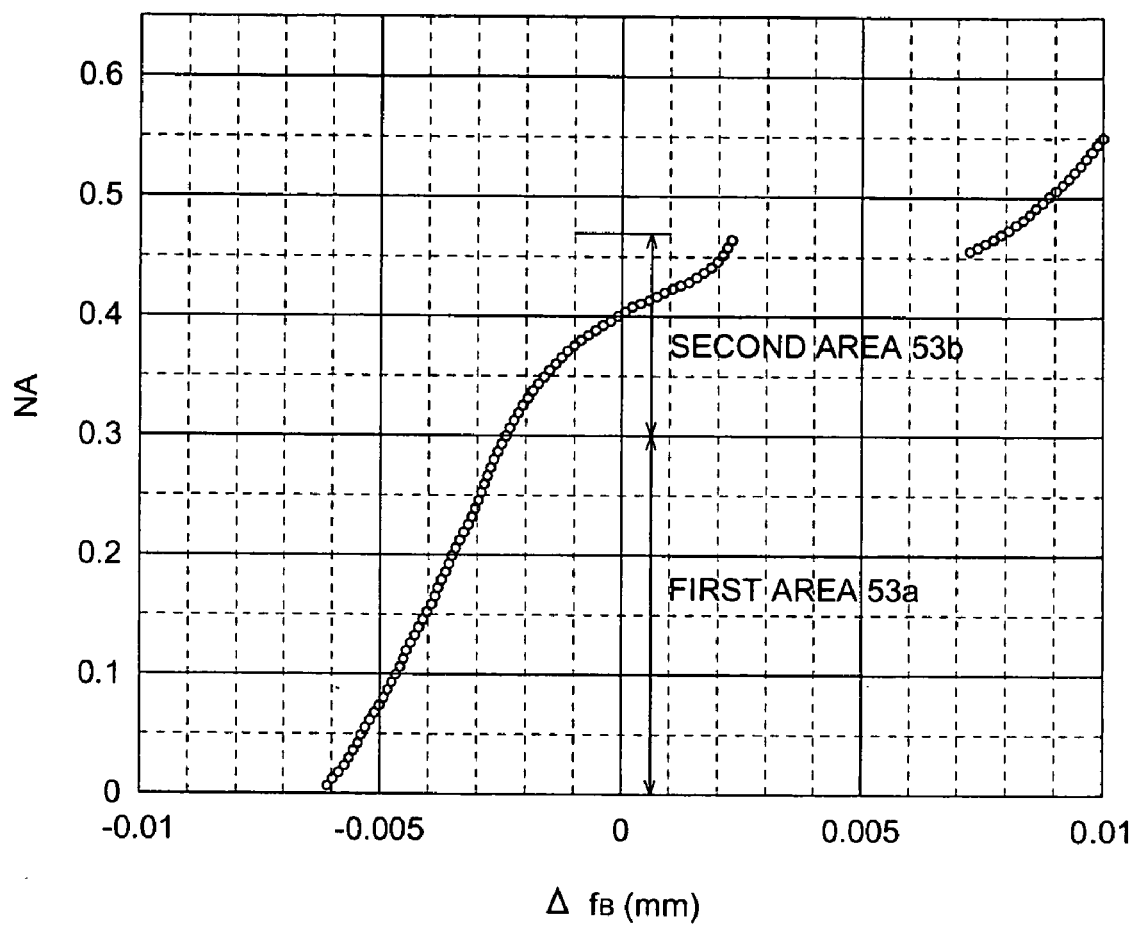
FIG. 3 is a diagram of longitudinal spherical aberration of CD.

If the third order diffracted light with wavelength λ3 is assumed to be used, it is possible to make an amount of light to be great in the first area 53a and the second area 53b, but on the other hand, spherical aberration of the light flux with wavelength λ3 grows to be too large on the first area 53a as shown in FIG. 3, which is a problem.

Therefore, by making the diffraction order of the light flux with wavelength λ1 passing through the first area 53a to be an odd number when the diffraction order of the light flux with wavelength λ1 passing through the second area 53b is made to be an even number, it is possible to reconcile securing of an amount of light of the light flux with wavelength λ3 on central area 53 (first area 53a and second area 53b) and correction of spherical aberration, because spherical aberration is corrected although the diffraction efficiency of the light flux with wavelength λ3 that has passed through the area 53a is low.

Figure 4:
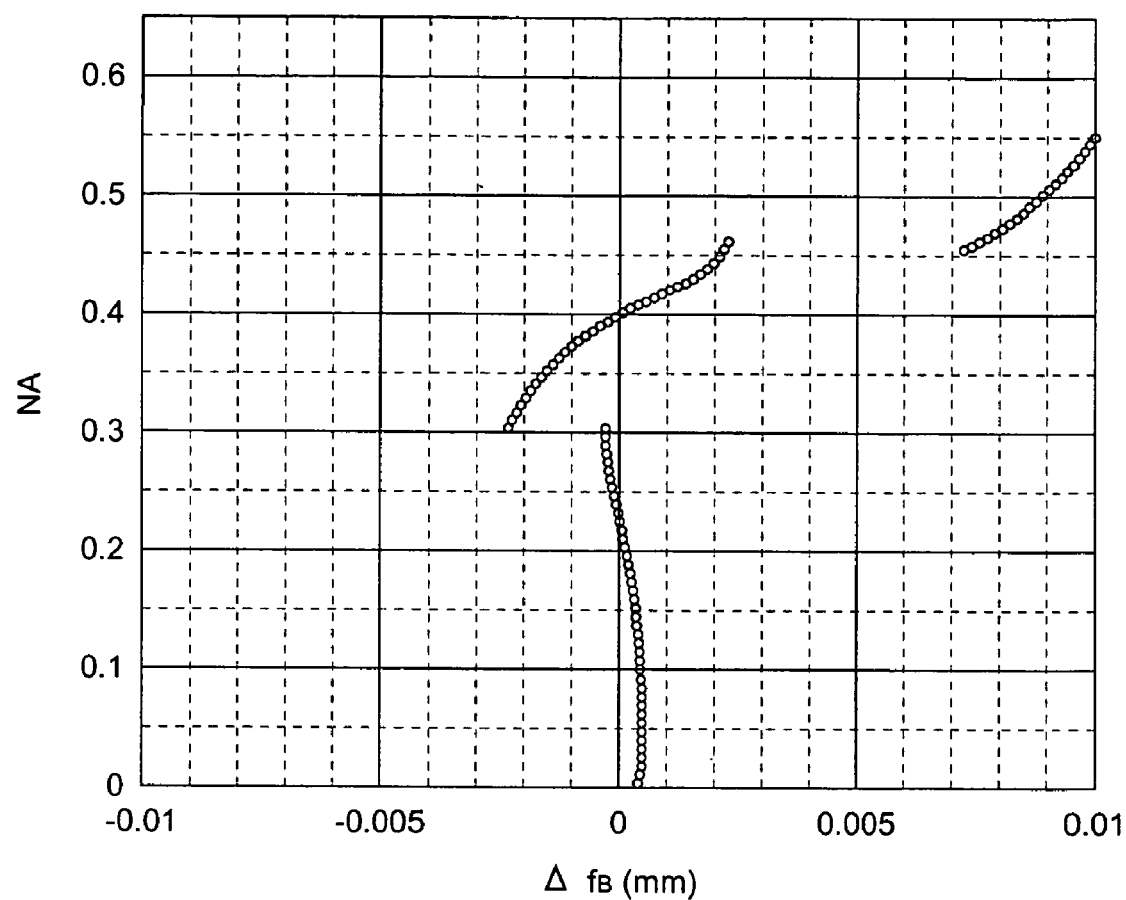
FIG. 4 is a diagram of longitudinal spherical aberration of CD.

In other words, as shown in FIG. 4, when the diffraction order of the light flux with wavelength λ1 passing through the first area 53a is made to be an odd number (for example, $5^{th}$), an amount of light is dispersed to the second diffracted light and third diffracted light as far as the light flux with wavelength λ3 passing through the first area 53a, which results in lower amount of light compared with the second area 53b.

However, it is possible to control spherical aberration on the first area 53a where an amount of light has been lowered, as shown in FIG. 4.

Therefore, a sufficient amount of light can be secured on the second area 53b by controlling spherical aberration on the first area 53a, and thereby, a light flux with wavelength λ3 can be used sufficiently for conducting recording and/or reproducing of information for CD 33, in terms of the total central area 53.

Incidentally, it is also possible to form a plurality of the first areas 53a and a plurality of the second areas 53b on the central area 53, and an area including optical axis L may also be made to be the second area 53b.

Figure 5:
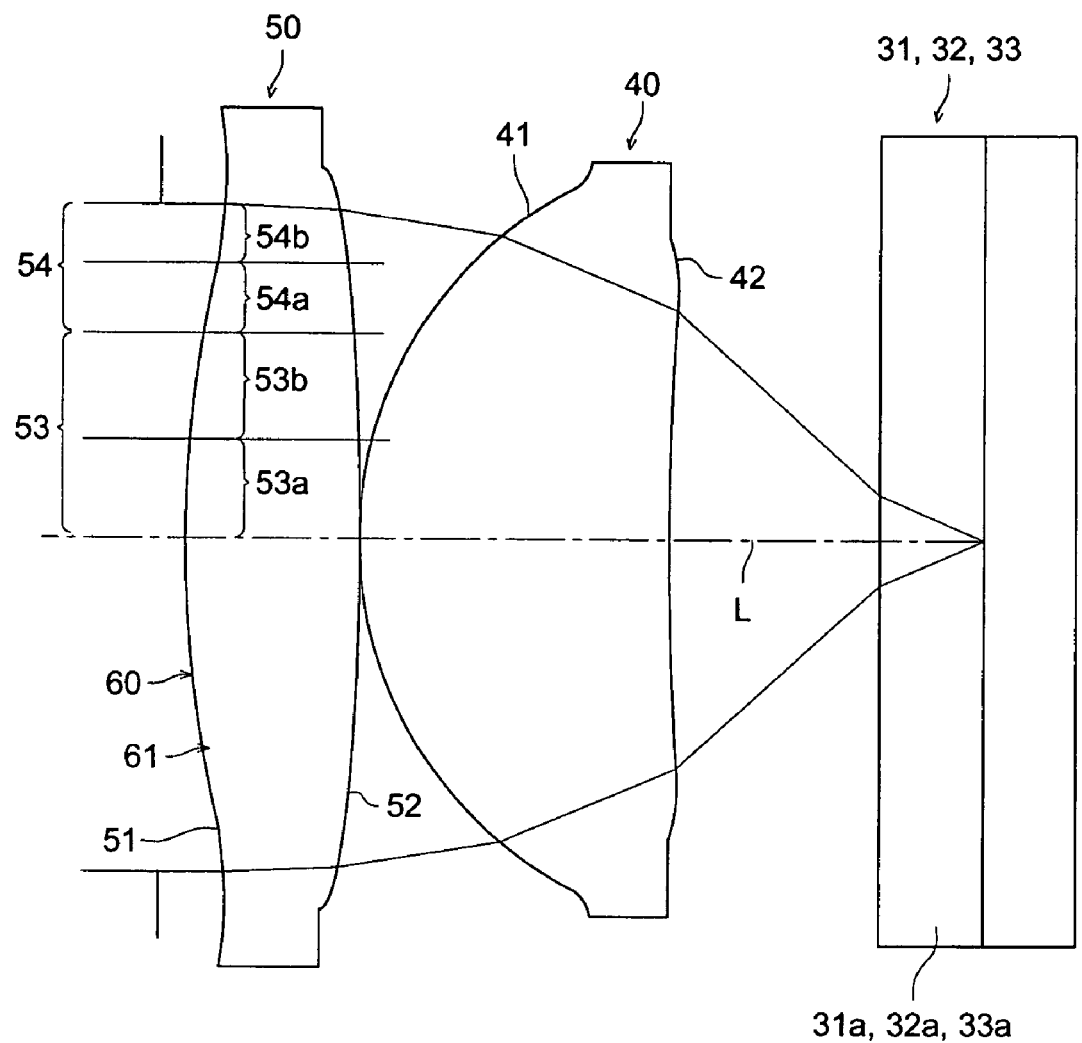
FIG. 5 is a diagram of lateral sections of primary portions showing the structures of a first optical element and an objective lens.

Further, the second area 53b may also be connected directly to the first area 53a and to peripheral area 54 without having step surface 55, as shown in FIG. 5.

Further, phase difference providing structure 60 has a color correction function which corrects an amount of aberration fluctuation at the same position in the direction of optical axis L caused between before and after wavelength fluctuation in the case of fluctuation by 1 nm from λ1 for the wavelength of a light flux emitted from first light source 11 on the occasion of wavelength fluctuation such as mode hop, to 0.03 λ rms or less.

As shown in FIG. 2 and FIG. 5, objective lens 40 is a single lens made of plastic wherein each of plane of incidence 41 and plane of emergence 42 is an aspheric surface, and the plane of incidence 41 and the plane of emergence 42 are represented by a refracting interface.

It is so arranged that spherical aberration caused on a light-converged spot of each optical disc by a wavelength difference between a light flux with wavelength λ1 and a light flux with wavelength λ2 is corrected by combining refracting power of plane of incidence 41 and plane of emergence 42 of the objective lens 40 and refracting power of plane of incidence 51 and plane of emergence 52 of the first optical element 50. In other words, in the invention, not only plane of incidence 41 and plane of emergence 42 of the objective lens 40 but also plane of incidence 51 and plane of emergence 52 of the first optical element 50 are made to have functions to correct spherical aberration, though spherical aberration has been corrected by a plane of incidence and a plane of emergence of an objective lens in the conventional optical pickup device. This makes it possible to increase a degree of freedom for design of the objective lens 40 and the first optical element 50.

In particular, in the present embodiment, plane of incidence 51 and plane of emergence 52 of the first optical element 50 are made to be a convex surface, which makes the aforementioned refracting power to be large, resulting in an acquisition of high effects of correcting spherical aberration.

Incidentally, though m1=m2=m3=0 holds in the embodiment stated above, it is also possible to have m1=0, m2=0 and m3≠0, and it is preferable, in this case, to use an even number for the diffraction order of the light flux with wavelength λ1 that is given a phase difference by phase difference providing structure 60 while passing through central area 53, and is converged on an information recording surface of AOD 31.

The reason for the foregoing is that a sufficient amount of light can be secured for the diffracted light with wavelength λ3 by making the diffraction order of a light flux with wavelength λ1 passing through central area 53 (first area 53a and second area 53b) to be an even number, and spherical aberration of a light flux with wavelength λ3 on first area 53a can be corrected to the level where there is not trouble in practical use, by making the light flux with wavelength λ3 to enter objective lens 40, under the condition of m3≠0, namely, as divergent light, although there is a fear that spherical aberration of a light flux with wavelength λ3 becomes too large as shown in FIG. 3.

Further, it is preferable, to use an odd number for the diffraction order of the light flux with wavelength λ1 that is given a phase difference by phase difference providing structure 60 while passing through peripheral area 54 and is converged on an information recording surface of AOD 31.

By making the diffraction order of a light flux with wavelength λ1 to be an even number, an amount of light of a light flux with wavelength λ3 is dispersed into several light with diffraction orders on the peripheral area 54 corresponding to an area other than an area corresponding to the numerical aperture of CD 33.

Therefore, a light flux with wavelength λ3 passing through peripheral area 54 can be made to be a flare, and first optical element 50 can be made to have the so-called an aperture restricting function.

Incidentally, it is also possible to arrange separately an optical element having the aperture restricting function in an optical path of a light flux with wavelength λ3, or to coat, on an optical surface of objective lens 40 or of first optical element 50, a multi-layer film having the so-called wavelength selecting characteristic that conducts the aperture restriction by transmitting a light flux with wavelength λ1 and a light flux with wavelength λ2 and by reflecting a light flux with wavelength λ3.

Further, it is also possible to have m1=0, m2≠0 and m3≠0, and further to have m2=m3.

In this case, a light flux with wavelength λ2 and a light flux with wavelength λ3 can be made to enter objective lens 40, and an optical path for the light flux with wavelength λ2 and an optical path for the light flux with wavelength λ3 can be made to be the same. Therefore, second light source 12 and third light source 13 can be united solidly and optical pickup device 10 can be made small in size.

Figure 6:
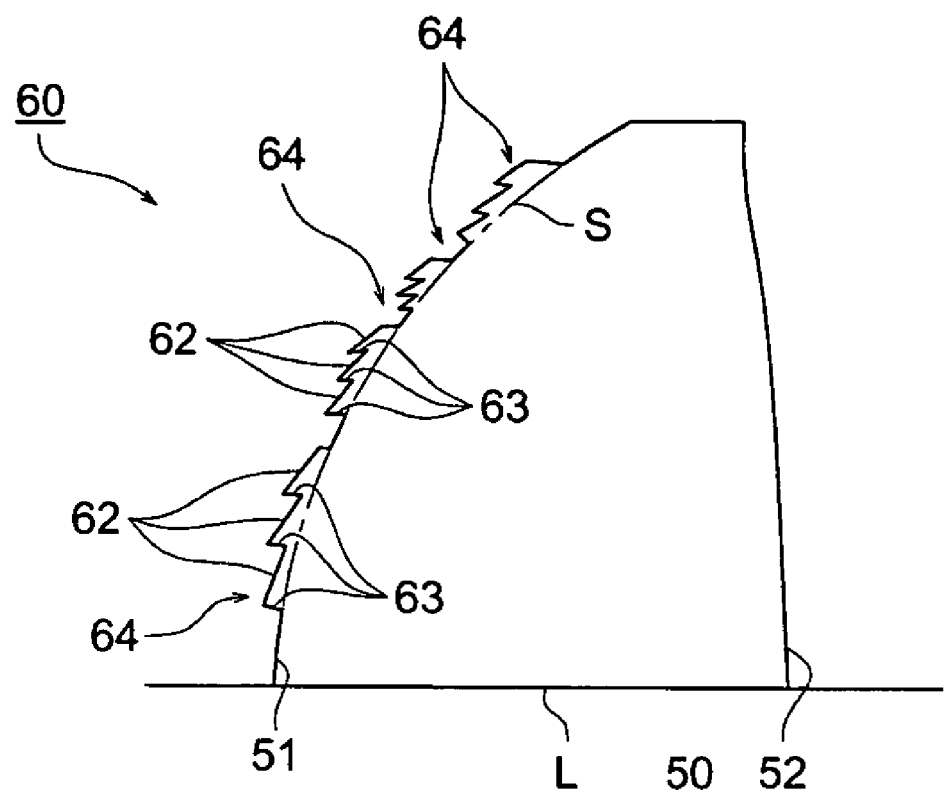
FIG. 6 is a diagram of lateral sections of primary portions showing the structures of a first optical element.

Incidentally, as phase difference structure 60, the one shown in FIG. 6, for example, may also be used. Phase difference structure 60 of first optical element 50 shown in FIG. 6 is composed of plural step structures 64 wherein plural ring-shaped zones 62 each having its center on an optical axis are continued through steps 63 which are substantially in parallel with an optical axis.

Each ring-shaped zone 62 is formed so that it is projected more toward the light source side (forward) as it is farther from the optical axis, which gives a prescribed optical path difference to a light flux entering each ring-shaped zone 62, thus, a phase difference is caused on each light flux, resulting in substantial equality of phases of light fluxes which have passed through ring-shaped zones 62 on the information recording surface. Incidentally, a form of each step 63 can be regulated by an amount of displacement in the direction of optical axis L for base aspheric surface S.

Further, the phase difference structure 60 may either be provided only on plane of emergence 52 of first optical element 50 or be provided on both surfaces of plane of incidence 51 and plane of emergence 52. Or, it may also be provided on either one or both of plane of incidence 41 and plane of emergence 42 of objective lens 40.

Further, as AOD 31, it is also possible to use the so-called two-layer disc which is composed of t1-thick protective base board 31a, a first information recording surface, an intermittent layer and a second information recording surface which are laminated in this order in the direction of an optical axis from the light source side.

Incidentally, it is preferable that a distance on the optical axis from an optical surface of the first optical element 50 closer to the light source to an optical surface (plane of emergence 42) of the objective lens 40 closer to an optical information recording medium is 3 mm or less. Owing to this, the first optical element 50 carried by an actuator and the objective lens 40 can be made to be light in weight, and power consumption of optical pickup device 10 can be controlled accordingly.

Further, it is preferable that a focal length of a compound system composed of objective lens 40 and first optical element 50 for a light flux with wavelength $\lambda 1$ is within a range of 2.0 mm–4.0 mm. Due to this, a converging optical system can be downsized.

Further, it is preferable that a distance on the optical axis from plane of emergence 42 of objective lens 40 to the surface of protective base board 31a of AOD 31 is not less than 1 mm. Hereby, a sufficient working distance can be secured, and interference with objective lens 40 in the course of disc driving can be prevented.

It is preferable that an optical element having a color correcting function that corrects an amount of aberration fluctuation at the same position in the optical axis direction, before and after the wavelength fluctuation in the case when a wavelength of the light flux emitted from the second light source 12 is changed by 1 nm from $\lambda 2$ to 0.03 $\lambda$ rms or less, is arranged at a location that is the optical path of the light flux with wavelength $\lambda 2$ and is outside the optical path of the light flux with wavelength $\lambda 1$. Due to this, color correction functions for DVD 32 can be given.

It is further preferable that the number of diffractive ring-shaped zones 61 or the number of step structures 64 is in a range of 15–30. Owing to this, it is possible to give sufficient diffractive functions to each light flux, and to secure sufficient amount of light.

Further, it is possible either to arrange so that Abbe's number of an objective optical element for the light flux with wavelength $\lambda 1$ is different from that of the first optical element 50 for the light flux with wavelength $\lambda 1$, or to arrange so that Abbe's number of an objective optical element for the light flux with wavelength $\lambda 1$ is the same as that of the first optical element 50 for the light flux with wavelength $\lambda 1$.

In the course of driving optical pickup device 10, it is also possible to arrange so that objective lens 40 only is mounted on an actuator and a relative position to the first optical element 50 is changeable, or to arrange so that objective lens 40 and the first optical element 50 are connected each other to be mounted on an actuator as one objective element.

EXAMPLES

Example 1

Next, Example 1 will be explained as follows.

In the present example, plane of incidence 51 and plane of emergence 52 of the first optical element 50 and plane of incidence 41 and plane of emergence 42 of objective lens 40 are made to be of an aspheric surface form in the same way as one shown in FIG. 5, and a plurality of serrated diffractive ring-shaped zones 61 each having its center on an optical axis are formed on the plane of incidence 51 of the first optical element 50 as phase difference providing structure 60, which constructs optical pickup device 10 having compatibility between two types of optical discs of AOD 31 and DVD 32 which use respectively a light flux with $\lambda 1$ and a light flux with $\lambda 2$.

Lens data of the first optical element 50 and the objective lens 40 are shown in Table 1 and Table 2.

Example 1

| Focal length of objective lens | | f1: 3 mm | f2: 3.08 mm | |
|---|---|---|---|---|
| Image-side numerical aperture | | NA1: 0.65 | NA2: 0.60 | |
| Magnification | | m1: 0 | m2: 0 | |
| $i^{th}$ surface | ri | di (407 nm) | ni (407 nm) | di (655 nm) | ni (655 nm) |
| 0 | | $\infty$ | | $\infty$ | |
| 1 (Diameter of diaphragm) | $\infty$ | 0.1 ($\phi$3.9 mm) | | 0.1 ($\phi$3.9 mm) | |
| 2 | 10.6965 | 1.00000 | 1.54277 | 1.00000 | 1.52915 |
| 3 | 412.149 | 0.00 | 1.0 | 0.00 | 1.0 |
| 4 | 1.99297 | 1.85000 | 1.54277 | 1.85000 | 1.52915 |
| 5 | −121.307 | 1.29 | 1.0 | 1.34 | 1.0 |
| 6 | $\infty$ | 0.6 | 1.61869 | 0.6 | 1.57752 |
| 7 | $\infty$ | | | | |

TABLE 2

Aspheric surface data

| Second surface | |
|---|---|
| Aspheric surface coefficient | $\kappa$ +1.1079 × E-0 |
| | A4 +1.1148 × E-3 |
| | A6 −8.8442 × E-4 |
| | A8 −2.9200 × E-5 |
| | A10 +1.5287 × E-5 |
| Optical path difference function | B2 −5.3621 × E-1 |
| | B4 +6.8602 × E-2 |
| | B6 +1.1042 × E-3 |
| | B8 −3.7416 × E-3 |
| | B10 +6.7057 × E-4 |
| Third surface | |
| Aspheric surface coefficient | $\kappa$ −1.1391 × E-20 |
| | A4 −2.9516 × E-3 |
| | A6 −7.3128 × E-5 |
| | A8 −1.6372 × E-4 |
| | A10 +2.4740 × E-5 |
| Fourth surface | |
| Aspheric surface coefficient | $\kappa$ −4.9663 × E-1 |
| | A4 +8.7431 × E-4 |
| | A6 +1.2621 × E-3 |
| | A8 −4.2626 × E-6 |
| | A10 −1.5690 × E-4 |
| | A12 +6.0325 × E-5 |
| | A14 −1.2592 × E-5 |

TABLE 2-continued

Aspheric surface data

Fifth surface

| | |
|---|---|
| Aspheric surface coefficient | κ −3.9494 × E+4 |
| | A4 −1.7977 × E−3 |
| | A6 +7.1611 × E−3 |
| | A8 −5.3332 × E−3 |
| | A10 +6.3514 × E−4 |
| | A12 +2.0895 × E−4 |
| | A14 −4.6468 × E−5 |

TABLE 3

Order of diffracted light having maximum diffraction efficiency and the efficiency in each area

| | Order | | Area ratio for efficiency (×100%)/ effective diameter | |
|---|---|---|---|---|
| Example 1 | AOD | DVD | AOD | DVD |
| | 5 | 3 | 1.00/1 | 0.99/1 |

As shown in Table 1, the objective lens 40 of the present example is established to have focal length $f_1$=3.00 mm, image-side numerical aperture NA1=0.65 and image forming magnification m1=0, when wavelength λ1 emitted from first light source 11 is 407 nm, and is established to have focal length $f_2$=3.08 mm, image-side numerical aperture NA2=0.60 and image forming magnification m2=0, when wavelength λ2 emitted from second light source 12 is 655 nm.

Surface numbers 2 and 3 in Table 1 show respectively plane of incidence 51 and plane of emergence 52 of the first optical element 50, while, surface numbers 4 and 5 show respectively plane of incidence 41 and plane of emergence 42 of the objective lens 40. Further, ri represents a radius of curvature, di represents a position from $i^{th}$ surface to $(i+1)^{th}$ surface in the direction of optical axis L and ni represents refractive index of each surface.

Each of the second–fifth surfaces is formed to be an aspheric surface which is regulated by a numerical expression in which each of coefficients shown in Table 1 and Table 2 is substituted in the following expression (Numeral 1), and is symmetric with regard to optical axis L around it.

Numeral 1

Expression of Aspheric Surface Form $$X(h) = \frac{(h^2/r_i)}{1+\sqrt{1-(1+\kappa)(h/r_i)^2}} + \sum_{i=0}^{n} A_{2i}h^{2i}$$

In the expression above, X (h) represents an axis (the direction of travel of light is assumed to be positive) in the direction of optical axis L, κ represents conic constant and $A_{2i}$ represents aspheric surface coefficient.

An optical path length given, by diffractive ring-shaped zone 61 formed on the second surface, to a light flux with each wavelength is regulated by a numerical expression in which coefficient shown in Table 2 is substituted in the optical path difference function of Numeral 2.

Numeral 2

Optical Path Difference Function $$\Phi(h) = \left(n \times \frac{\lambda}{\lambda_B}\right) \times \sum_{i=0}^{5} B_{2i}h^{2i}$$

n; Diffraction order λ; Wavelength
$\lambda_B$; Blazed wavelength

In the expression above, $B_{2i}$ represents a coefficient of the optical path difference function. Further, blazed wavelength relating to diffractive ring-shaped zone 61 on the second surface is 1 mm.

As shown in Table 3, fifth order (odd number) diffracted light of the light flux with wavelength λ1 having the maximum diffraction efficiency is assumed to be used, and third order diffracted light of the light flux with wavelength λ2 was assumed to be used to correspond to the foregoing.

Figure 7:
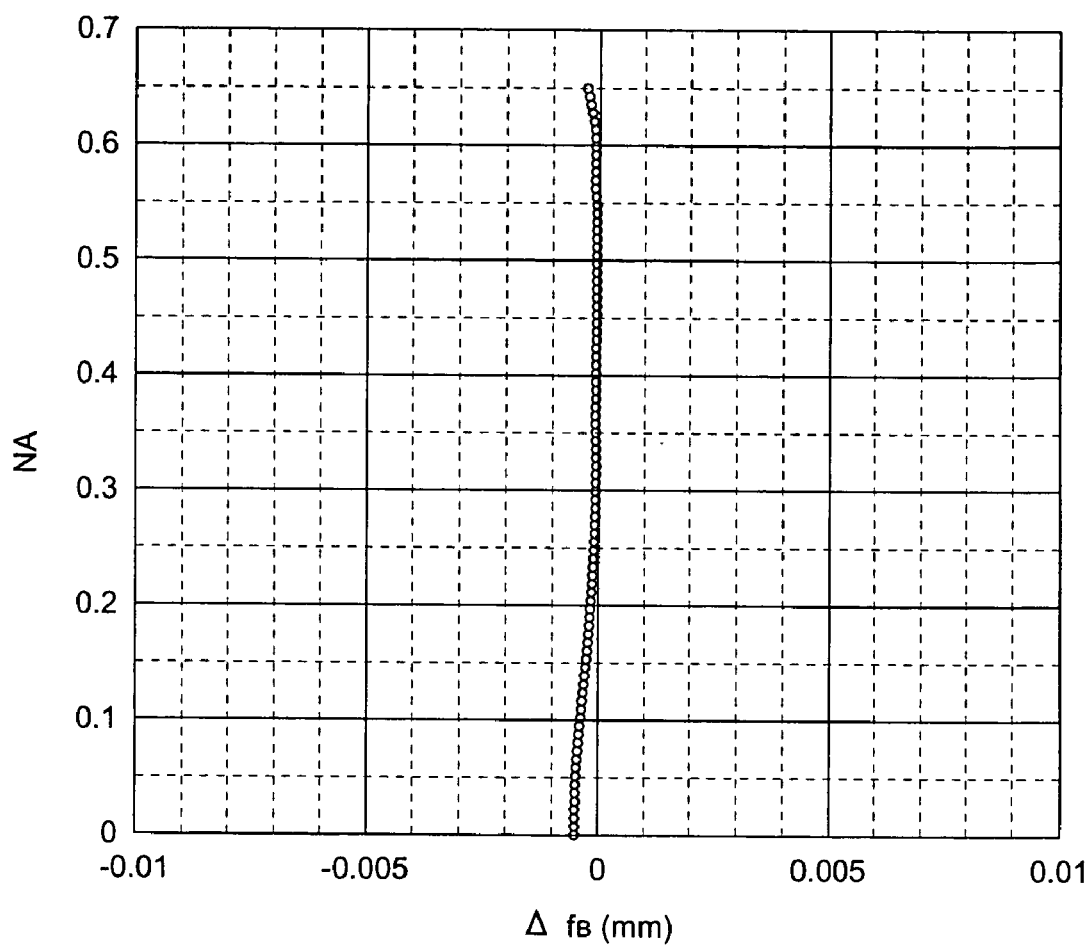
FIG. 7 is a diagram of longitudinal spherical aberration of AOD.
Figure 8:
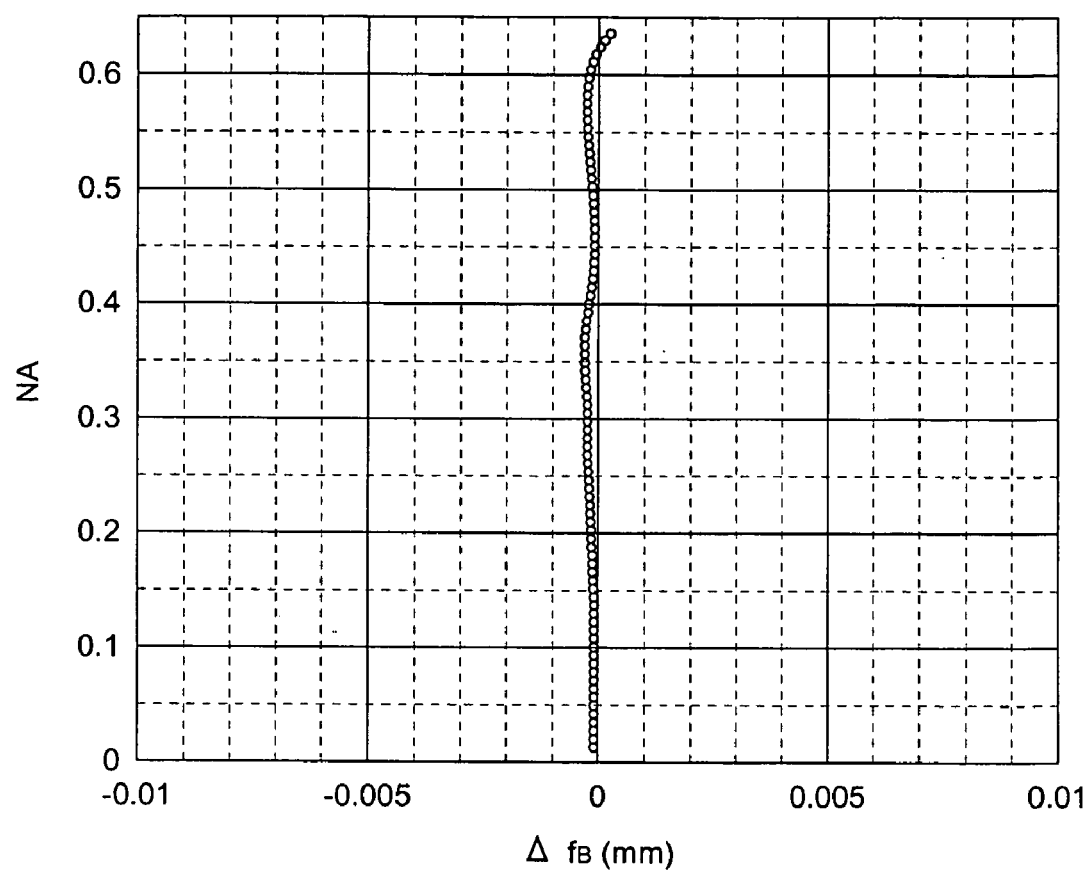
FIG. 8 is a diagram of longitudinal spherical aberration of DVD.

FIG. 7 is a graph showing an amount of spherical aberration and numerical aperture (NA) in AOD 31 where a light flux with wavelength λ1 is used, while, FIG. 8 is a graph showing an amount of spherical aberration and numerical aperture (NA) in DVD 32 where a light flux with wavelength λ2 is used.

From FIG. 7 and FIG. 8, it is understood that spherical aberration is corrected properly within a necessary numerical aperture for both AOD 31 and DVD 32.

Figure 9:
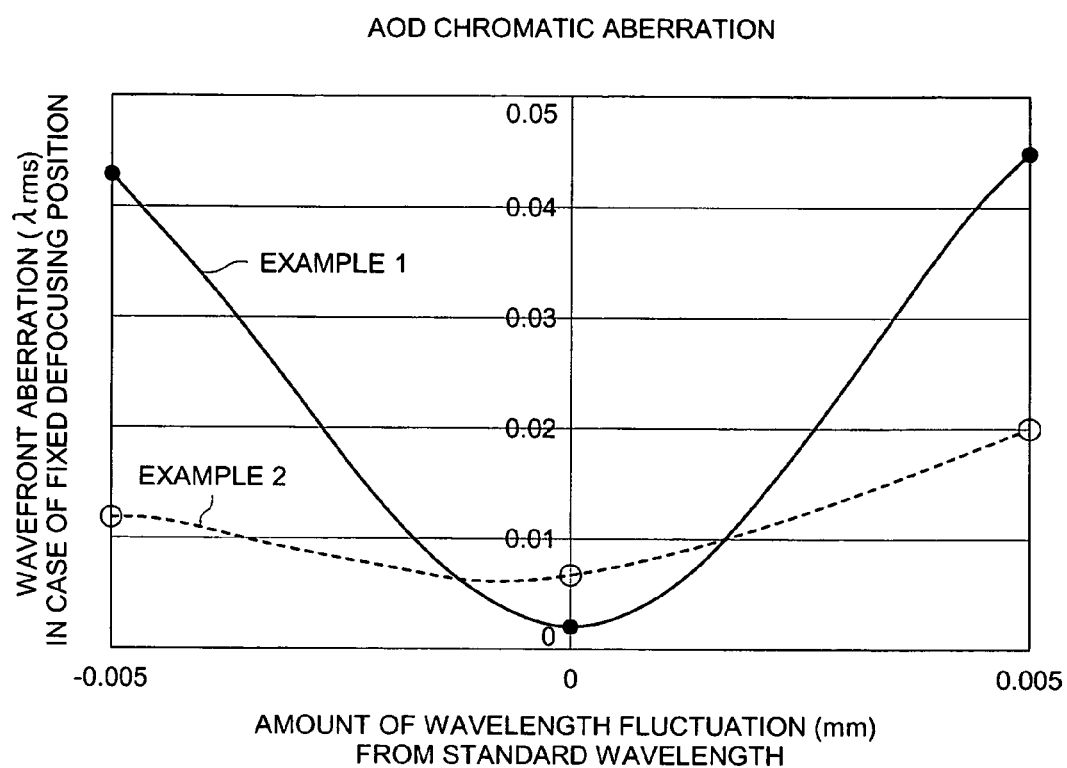
FIG. 9 is a graph showing an amount of fluctuation of wavefront aberration in the case of mode hop.

FIG. 9 shows an amount of fluctuation of wavefront aberration in the case of mode hop. Since an amount of wavelength fluctuation in the case of mode hop is about 1 μm in general, it is understood that an amount of fluctuation of wavefront aberration is controlled to be 0.07 λ rms or less of a diffraction limit within a range of about 1 μm, and sufficient color correction functions are provided.

Example 2

Next, Example 2 will be explained as follows.

The present example has optical pickup device 10 having compatibility for three types of optical discs including AOD 31, DVD 32 and CD 33 which use respectively three types of light fluxes with wavelengths of λ1, λ2 and λ3.

In the present example, plane of incidence 51 and plane of emergence 52 of the first optical element 50 and plane of incidence 41, and plane of emergence 42 of objective lens 40 are made to be of an aspheric surface form in the same way as one shown in FIG. 2.

Further, a plurality of serrated diffractive ring-shaped zones 61 each having its center on an optical axis are formed on the plane of incidence 51 of the first optical element 50 as phase difference providing structure 60, and the plane of incidence 51 is divided into central area 53 (first area 53*a* and second area 53*b*) and peripheral area 54 (third area 54*a* and fourth area 54*b*).

Each of light fluxes having respectively wavelengths λ1–λ3 having passed the first area 53*a* and second area 53*b* forms a light-converged spot on an information recording surface of each optical disc. Each of light fluxes with wavelengths λ1 and λ2 having passed the third area 54*a* forms a light-converged spot on an information recording surface of each optical disc, and a light flux with wavelength λ3 is made to be a flare. The light flux with wavelength λ1 having passed the fourth area 54*b* forms a light-converged spot on an information recording surface of the optical disc, and each of light fluxes respectively with wavelength λ2 and wavelength λ3 is made to be a flare.

Lens data of the first optical element 50 and the objective lens 40 are shown in Table 4 and Table 5.

TABLE 4

Example 2

| | | | | | | |
|---|---|---|---|---|---|---|
| Focal length of objective lens | f1: 3 mm | | f2: 3.08 mm | | f3: 3.11 mm | |
| Image-side numerical aperture | NA1: 0.65 | | NA2: 0.6 | | NA3: 0.45 | |
| Magnification | m1: 0 | | m2: 0 | | m3: 0 | |

| $i^{th}$ surface | ri | di (407 nm) | ni (407 nm) | di (655 nm) | ni (655 nm) | di (785 nm) | ni (785 nm) |
|---|---|---|---|---|---|---|---|
| 0 | | ∞ | | ∞ | | ∞ | |
| 1 (Diameter of diaphragm) | ∞ | 0.1 (φ3.9 mm) | | 0.1 (φ3.9 mm) | | 0.1 (φ3.9 mm) | |
| 2 | 7.43385 | 1.00000 | 1.54277 | 1.00000 | 1.52915 | 1.00000 | 1.52541 |
| 2' | 9.46593 | 0.00076 | 1.54277 | 0.00076 | 1.52915 | 0.00076 | 1.52541 |
| 2'' | 7.91112 | 0.00000 | 1.54277 | 0.00000 | 1.52915 | 0.00000 | 1.52541 |
| 2''' | 7.91112 | 0.00000 | 1.54277 | 0.00000 | 1.52915 | 0.00000 | 1.52541 |
| 3 | −1124.76 | 0.00 | 1.0 | 0.00 | 1.0 | 0.00 | 1.0 |
| 4 | 1.95826 | 1.85000 | 1.54277 | 1.85000 | 1.52915 | 1.85000 | 1.52541 |
| 5 | 24.0362 | 1.23 | 1.0 | 1.28 | 1.0 | 0.00 | 0.94 |
| 6 | ∞ | 0.6 | 1.61869 | 0.6 | 1.57752 | 1.2 | 1.57063 |
| 7 | ∞ | | | | | | |

The symbol *di shows a displacement from $i^{th}$ surface to $(i + 1)^{th}$ surface.
The symbol *d2' shows a displacement from $2^{nd}$ surface to $2^{'th}$ surface.
The symbol *d2'' shows a displacement from $2^{nd}$ surface to $21^{'''th}$ surface.

TABLE 5

Aspheric surface data

Second surface (0 < h < 0.95 mm: AOD/DVD/CD common area)

| Aspheric surface coefficient | κ +1.3333 × E+1 |
| | A4 +5.7565 × E−4 |
| | A6 −5.9265 × E−3 |
| | A8 +2.5671 × E−3 |
| | A10 +8.8202 × E−6 |
| Optical path difference function (blazed wavelength 1 mm) | B2 −4.6914 × E−1 |
| | B4 +1.5599 × E−1 |
| | B6 −1.9919 × E−1 |
| | B8 +1.4918 × E−1 |
| | B10 −3.7873 × E−3 |

$2^{'th}$ surface (0.95 mm < h < 1.41 mm: AOD/DVD/CD common area)

| Aspheric surface coefficient | κ +2.3691 × E+1 |
| | A4 +1.0310 × E−2 |
| | A6 −3.6434 × E−3 |
| | A8 +7.4121 × E−5 |
| | A10 −5.8394 × E−4 |
| Optical path difference function (blazed wavelength 1 mm) | B2 −2.8903 × E−1 |
| | B4 +1.4750 × E−1 |
| | B6 −1.9750 × E−2 |
| | B8 +3.4940 × E−3 |
| | B10 −7.7654 × E−3 |

$2^{''th}$ surface (1.41 mm < h < 1.86 mm: AOD/DVD common area)

| Aspheric surface coefficient | κ +3.7908 × E−0 |
| | A4 +1.5969 × E−3 |
| | A6 −1.5084 × E−3 |
| | A8 −1.5457 × E−4 |
| | A10 +2.7065 × E−5 |
| Optional path difference function | B2 −7.1279 × E−1 |
| | B4 +8.1634 × E−2 |
| | B6 −4.9452 × E−3 |
| | B8 −7.2139 × E−3 |

TABLE 5-continued

Aspheric surface data

| (blazed wavelength 1 mm) | B10 +1.0243 × E−3 |

$2^{'''th}$ surface (h < 1.86 mm: AOD exclusive area)

| Aspheric surface coefficient | κ +3.7908 × E−0 |
| | A4 +1.5969 × E−3 |
| | A6 −1.5084 × E−3 |
| | A8 −1.5457 × E−4 |
| | A10 +2.7065 × E−5 |
| Optical path difference function (blazed wavelength 1 mm) | B2 −7.1279 × E−1 |
| | B4 +8.1634 × E−2 |
| | B6 −4.9452 × E−3 |
| | B8 −7.2139 × E−3 |
| | B10 +1.0243 × E−3 |

Third surface

| Aspheric surface coefficient | κ −1.1391 × E−20 |
| | A4 −6.6141 × E−4 |
| | A6 −6.9396 × E−4 |
| | A8 −2.4453 × E−4 |
| | A10 +3.6152 × E−5 |

Fourth surface

| Aspheric surface coefficient | κ −4.6152 × E−1 |
| | A4 −1.7219 × E−3 |
| | A6 +1.9636 × E−3 |
| | A8 +1.0458 × E−4 |
| | A10 −1.5238 × E−4 |
| | A12 +5.1277 × E−5 |
| | A14 −1.1941 × E−5 |

Fifth surface

| Aspheric surface coefficient | κ −1.4416 × E+3 |
| | A4 −3.6420 × E−3 |
| | A6 +1.4127 × E−2 |
| | A8 −7.1907 × E−3 |
| | A10 −1.1859 × E−3 |
| | A12 +1.3969 × E−3 |
| | A14 −2.5062 × E−4 |

As shown in Table 4, the objective lens 40 of the present example is established to have focal length $f_1=3.00$ mm, image-side numerical aperture NA1=0.65 and image forming magnification m1=0, when wavelength λ1 emitted from first light source 11 is 407 nm, then, it is established to have focal length $f_2=3.08$ mm, image-side numerical aperture NA2=0.60 and image forming magnification m2=0, when wavelength λ2 emitted from second light source 12 is 655 nm, and is established to have focal length $f_2=3.11$ mm, image-side numerical aperture NA3=0.45 and image forming magnification m2=0, when wavelength λ3 emitted from third light source 13 is 785 nm.

Surface numbers 2, 2', 2" and 2'" in Table 4 show respectively first–fourth areas 53a–54b of plane of incidence 51 of the first optical element 50, while, surface numbers 3 shows plane of emergence 52 of the first optical element 50, and surface numbers 4 and 5 show respectively plane of incidence 41 and plane of emergence 42 of objective lens 40. Further, ri represents a radius of curvature, di represents a position from $i^{th}$ surface to $(i+1)^{th}$ surface in the direction of optical axis L and ni represents refractive index of each surface.

Each of the second-fifth surfaces is formed to be an aspheric surface which is regulated by a numerical expression in which coefficients shown in Table 4 and Table 5 are substituted in the Numeral 1, and is symmetric with regard to optical axis L around it.

An optical path length given, by diffractive ring-shaped zone 61 formed on each of the second—$2'''^{th}$ surfaces, to a light flux with each wavelength is regulated by a numerical expression in which coefficient shown in Table 5 is substituted in the optical path difference function of Numeral 2. Incidentally, blazed wavelength relating to each diffractive ring-shaped zone 61 is 1 mm.

As shown in Table 6, diffraction orders of the light flux with wavelength λ1 having the maximum diffraction efficiency are assumed to be fifth (odd number) and tenth (even number), and second order diffracted light and $5^{th}$ order diffracted light of the light flux with wavelength λ2 were assumed to be used to correspond to the foregoing.

TABLE 6

Diffracted light order having the maximum diffraction efficiency and the efficiency for each area

| | Order | | | Area ratio for efficiency (×100%)/effective diameter | | |
|---|---|---|---|---|---|---|
| Example 2 | AOD | DVD | CD | AOD | DVD | CD |
| Second surface | 5 | 3 | 2 | 1.00/0.24 | 0.99/0.26 | 0.39/0.45 |
| 2'th surface | 10 | 6 | 5 | 1.00/0.29 | 0.99/0.31 | 1.00/0.55 |
| 2''th surface | 5 | 3 | | 1.00/0.39 | 0.99/0.43 | |
| 2'''th surface | 5 | | | 1.00/0.09 | | |
| Total | | | | 1.00/1 | 0.99/1 | 0.73/1 |

Figure 10:
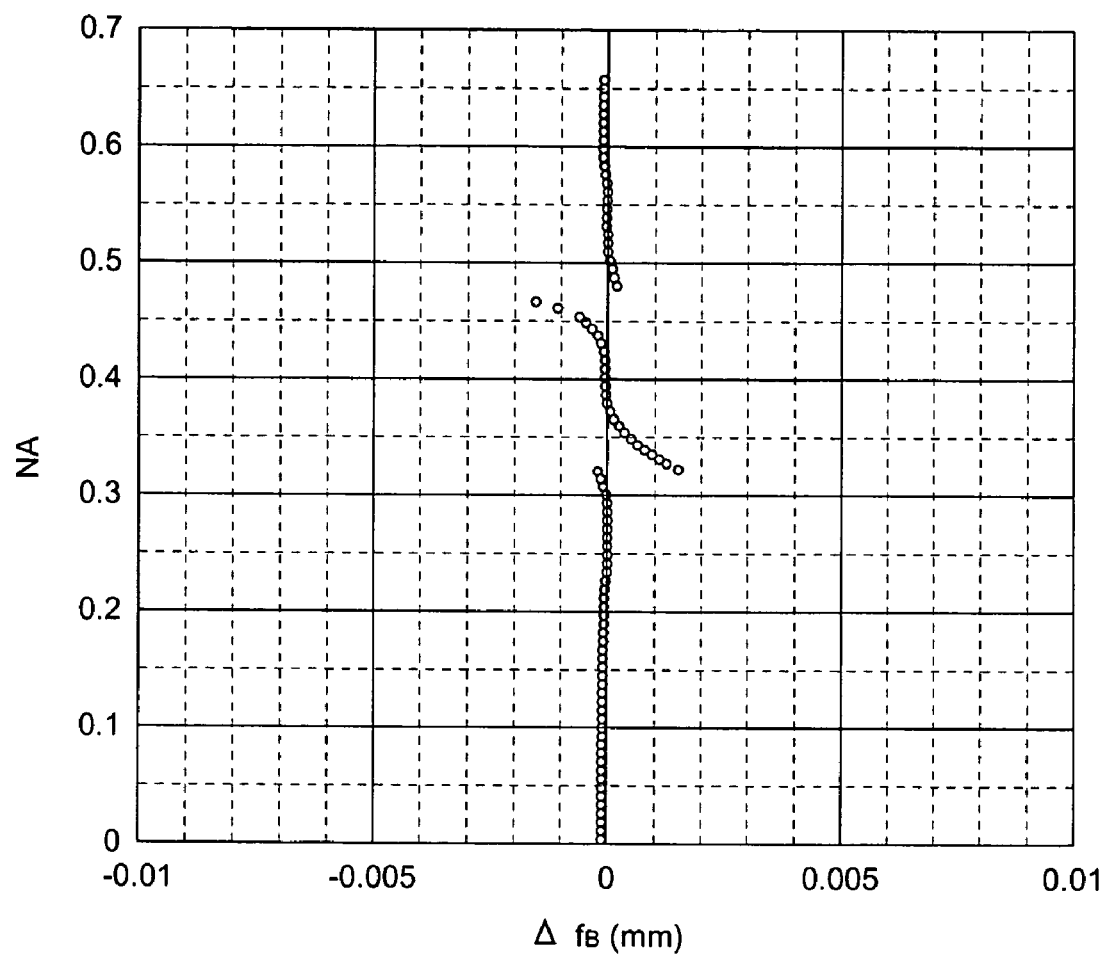
FIG. 10 is a diagram of longitudinal spherical aberration of AOD.
Figure 11:
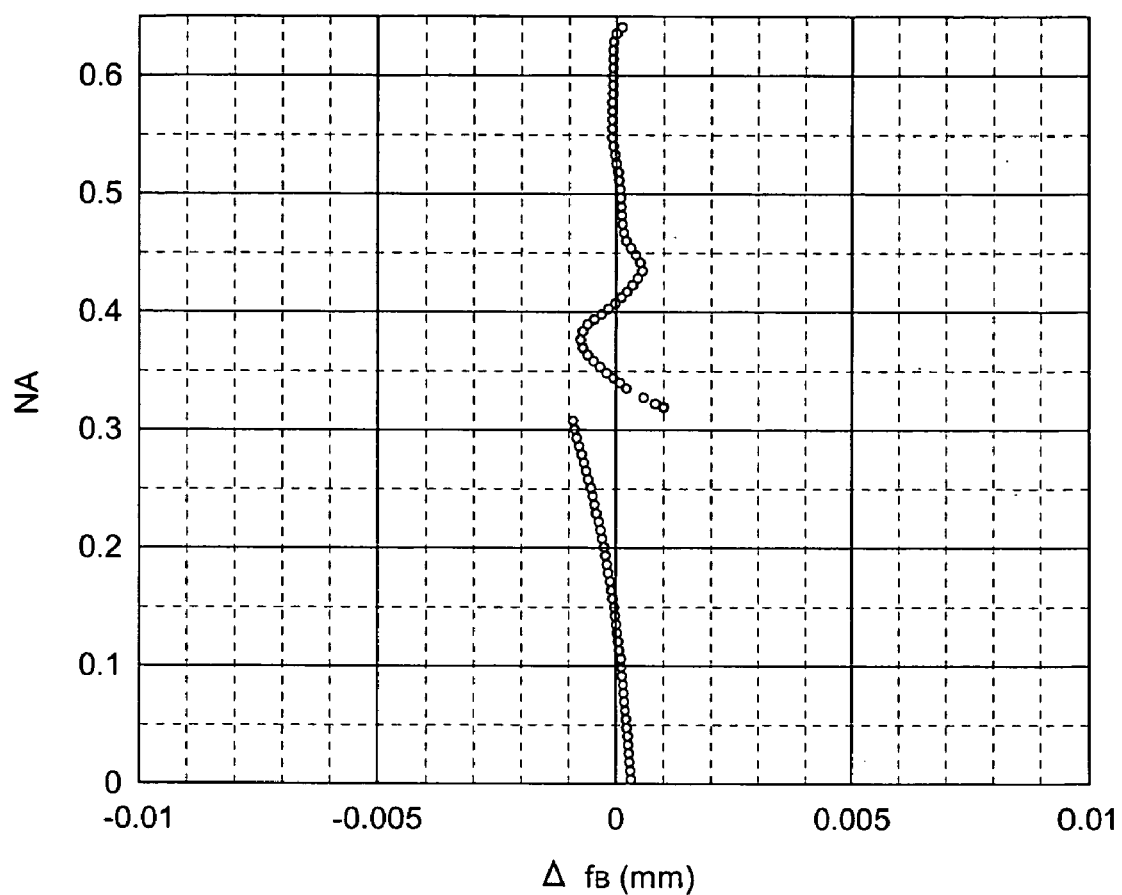
FIG. 11 is a diagram of longitudinal spherical aberration of DVD.
Figure 12:
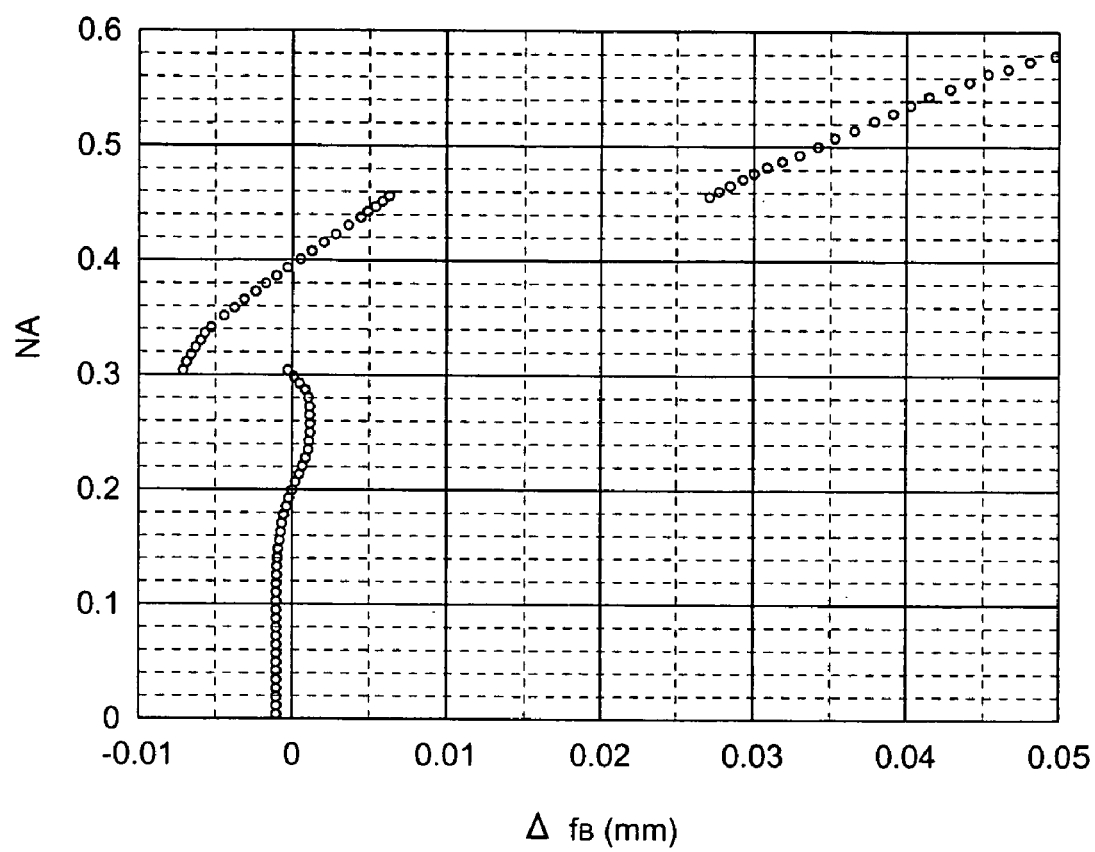
FIG. 12 is a diagram of longitudinal spherical aberration of CD.

FIG. 10 is a graph showing an amount of spherical aberration and a numerical aperture in AOD 31 employing a light flux with wavelength λ1, FIG. 11 is a graph showing an amount of spherical aberration and a numerical aperture in DVD 32 employing a light flux with wavelength λ2 and FIG. 12 is a graph showing an amount of spherical aberration and a numerical aperture in CD 33 employing a light flux with wavelength λ3.

From FIG. 10 and FIG. 11, it is understood that spherical aberration is properly corrected within a necessary numerical aperture for both AOD 31 and DVD 32.

Further, from FIG. 12, it is understood that spherical aberration is properly corrected for the total of the first area 53a and second area 53b corresponding to the necessary numerical aperture, although spherical aberration becomes large slightly in the second area 53b with respect to CD 33.

From FIG. 9, it is understood that sufficient color correction function is provided.

(Effect of the Invention)

The invention makes is possible to obtain a converging optical system which has compatibility between AOD and other optical information recording medium, and can control fluctuation of spherical aberration in the case of mode hop.

What is claimed is:

1. A light converging optical system for use in an optical pickup apparatus which conducts reproducing and/or recording information for a first optical information recording medium by converging a light flux with a wavelength of λ1 (350 nm≦λ1≦450 nm) emitted from a first light source on an information recording surface of a first optical information recording medium having a protective substrate with a thickness of t1 (0.5 mm≦t1≦0.7 mm) and conducts reproducing and/or recording information for a second optical information recording medium by converging a light flux with a wavelength of λ2 (650 nm≦λ2≦700 nm) emitted from a second light source on an information recording surface of a second optical information recording medium having a protective substrate with a thickness of t2 (0.5 mm≦t2≦0.7 mm), the light converging optical system comprising:

an objective optical element being a single lens and arranged to face directly the information recording surface of each of the first and second optical information recording media;

a first optical element being a single lens and arranged to face directly a light source side optical surface of the objective optical element; and a phase difference giving structure formed on at least one optical surface of optical surfaces of the objective optical element and the first optical element and for giving a phase difference to a light flux with a wavelength λ1, the phase difference giving structure having a chromatic aberration correcting function for correcting a chromatic aberration in such a way that when the wavelength of a light flux emitted from the first light source varies by 1 nm from λ1, the phase difference giving structure corrects a varied aberration quantity at the same position on the optical axis before and after the wavelength variation to 0.03 λ rms or less.

2. The light converging optical system of claim 1, wherein at least one optical surface on the first optical element is a convex surface.

3. The light converging optical system of claim 2, wherein both optical surfaces on the first optical element are a convex surface and an aspherical surface.

4. The light converging optical system of claim 2, wherein the light converging optical system has a function to correct a spherical aberration caused by a wavelength difference between a light flux with a wavelength λ1 and a light flux with a wavelength λ1.

5. The light converging optical system of claim 3, wherein light converging optical system achieves a function to correct a spherical aberration caused by a wavelength difference between a light flux with a wavelength λ1 and a light flux with a wavelength λ2 by combining a refractive power of an optical surface of the objective optical element and a refractive power of an optical surface of the first optical element.

6. The converging optical system of claim 2, wherein the objective optical element satisfies the following formulas:

$$m1=0$$

$$m2=0$$

where m1 is an optical magnification for a light flux with a wavelength λ1, and m2 is an optical magnification for a light flux with a wavelength λ2.

7. The light converging optical system of claim 6, wherein the phase difference giving structure is a diffractive structure and the light converging optical system converges a n-th (n is a natural number) ordered diffracted ray of a light flux with a wavelength λ1 generated by the diffractive structure onto the information recording surface on the first optical information recording medium.

8. The light converging optical system of claim 7, wherein n is 5 (n=5).

9. The light converging optical system of claim 7, wherein n is 8 (n=8).

10. The light converging optical system of claim 2, wherein the objective optical element satisfies the following formulas:

$$m1=0$$

$$m2\neq 0$$

where m1 is an optical magnification for a light flux with a wavelength λ1, and m2 is an optical magnification for a light flux with a wavelength λ2.

11. The light converging optical system of claim 10, wherein the phase difference giving structure is a diffractive structure and the light converging optical system converges a n-th (n is a natural number) ordered diffracted ray of a light flux with a wavelength λ1 generated by the diffractive structure onto the information recording surface on the first optical information recording medium.

12. The light converging optical system of claim 11, wherein the diffraction order n is 5.

13. The light converging optical system of claim 11, wherein the diffraction order n is 8.

14. The light converging optical system of claim 2, wherein a distance on the optical axis from an optical information recording media side optical surface of the objective optical element to a surface of the protective substrate on the first optical information recording medium is 1 mm or more.

15. The light converging optical system of claim 2, wherein a focal length of a composite system composed of the objective optical lens and the first optical element for a light flux with a wavelength λ1 is in the range from 2.0 mm to 4.0 mm.

16. The light converging optical system of claim 2, further comprising an optical element having a chromatic aberration correction function for correcting a chromatic aberration in such a way that when the wavelength of a light flux emitted from the second light source varies by 1 nm from λ2, the phase difference giving structure corrects a varied aberration quantity at the same position on the optical axis before and after the wavelength variation to 0.03 λ rms or less, wherein the optical element is arranged on an optical path of a light flux with a wavelength of λ2 and out of an optical path of a light flux with a wavelength of λ1.

17. The light converging optical system of claim 2, wherein the phase difference giving structure comprises a serrated diffractive ring-shaped zones or a stepped structure in which a plurality of ring-shaped zones are formed around the optical axis and neighboring ring-shaped zones of the plurality of ring-shaped zones are jointed through a step almost parallel to the optical axis, and wherein the number of the diffractive ring-shaped zones or the number of the steps in the stepped structure is in a range from 15 to 30.

18. The light converging optical system of claim 2, wherein the objective optical element and the first optical element have different Abbe constants for a light flux with a wavelength of λ1.

19. The light converging optical system of claim 2, wherein the objective optical element and the first optical element have the same Abbe constant for a light flux with a wavelength of λ1.

20. The light converging optical system of claim 18, wherein a material of at least one of the objective optical element or the first optical element is a plastic material.

21. The light converging optical system of claim 2, wherein a relative position between the objective optical element and the first optical element is changeable when the optical pickup apparatus is driven.

22. The light converging optical system of claim 2, wherein a relative position between the objective optical element and the first optical element is constant when the optical pickup apparatus is driven.

23. The light converging optical system of claim 22, wherein the objective optical element and the first optical element are physically connected to each other.

24. The light converging optical system of claim 21, wherein a distance on the optical axis from a light source side optical surface of the first optical element to an optical information recording medium side optical surface of the objective optical element is 3 mm or less.

25. The light converging optical system of claim 1, wherein the optical pickup apparatus conducts reproducing and/or recording information for a first optical information recording medium by converging a light flux with a wavelength of λ3 (750 nm≦λ3≦850 nm) emitted from a third light source on an information recording surface of a third optical information recording medium having a protective substrate with a thickness of t3 (1.1 mm≦t3≦1.3 mm).

26. The light converging optical element of claim 25, wherein the objective optical element satisfies the following formulas:

$$m1=0$$

$$m2=0$$

$$m3=0$$

where m1 is an optical magnification for a light flux with a wavelength λ1, m2 is an optical magnification for a light flux with a wavelength λ2, and m3 is an optical magnification for a light flux with a wavelength λ3.

27. The light converging optical system of claim 26, wherein the phase difference giving structure is a diffractive structure and an optical surface among optical surfaces of the objective optical element and the first optical element on which the phase difference giving structure is formed is divided into at least a central area including the optical axis and a peripheral area enclosing the circumference of the central area such that only a light flux with a wavelength of λ3 having passed through the central area is used for reproducing and/or recording information on the third information recording medium, and wherein the central area is divided into at least a first area and a second area, and the first area and the second area respectively have a diffractive structure in at least a part thereof such that when a light flux with a wavelength of λ1 is recorded on the information recording surface of the first information recording medium, a n1-th (n1 is a positive odd number) order diffracted light ray caused by a diffractive structure of the first area among a light flux of λ1 having passed through the first area is used and a n2-th (n2 is a positive even number) order diffracted light ray caused by a diffractive structure of the second area among a light flux of λ2 having passed through the second area is used.

28. The light converging system of claim 27, wherein the first and second areas are jointed through a stepped surface located along the optical axis.

29. The light converging optical system of claim 28, wherein the first area and the second area are formed by only one on the center area respectively.

30. The light converging optical system of claim 29, wherein the first area is formed in an area including the optical axis.

31. The light converging optical system of claim 29, wherein the second area is formed in an area including the optical axis.

32. The light converging optical system of claim 25, wherein the objective optical element satisfies the following formulas:

m1=0 m2=0 m3≠0 where m1 is an optical magnification for a light flux with a wavelength λ1, m2 is an optical magnification for a light flux with a wavelength λ2, and m3 is an optical magnification for a light flux with a wavelength λ3.

33. The light converging optical system of claim 32, wherein the phase difference giving structure is a diffractive structure and an optical surface among optical surfaces of the objective optical element and the first optical element on which the phase difference giving structure is formed is divided into at least a central area including the optical axis and a peripheral area enclosing the circumference of the central area such that a light flux with a wavelength of λ3 having passed through the central area is used for reproducing and/or recording information on the third information recording medium and a light flux with a wavelength of λ3 having passed through the peripheral area is not used for reproducing and/or recording information on the third information recording medium, and wherein the central area has the diffractive structure in at least a part thereof such that when a light flux with a wavelength of λ1 is recorded on the information recording surface of the first information recording medium, a n3-th (n3 is a positive even number) order diffracted light caused by the diffractive structure among a light flux of λ1 having passed through the central area is used.

34. The light converging optical system of claim 33, wherein a diffraction order of a light flux with a wavelength of λ1 having passed through the central area is 10, 8, 6, or 2.

35. The light converging optical system of claim 33, wherein the peripheral area has the diffractive structure in at least part thereof such that when a light flux with a wavelength of λ1 is recorded on the information recording surface of the first information recording medium, a n4-th (n4 is a positive odd number) order diffracted light ray caused by the diffractive structure among a light flux of λ1 having passed through the peripheral area is used.

36. The light converging optical system of claim 33, wherein a light flux with a wavelength of λ3 having passed through the peripheral area is given a phase difference by the phase difference giving structure to become flare so that the light flux with a wavelength of λ3 is not converged on the information recording surface on the third information recording medium.

37. The light converging optical system of claim 33, wherein an optical element having an aperture limiting function not to converge a light flux with a wavelength of λ3 passing through the peripheral area onto the third optical information recording medium, is arranged opposite to an light source side optical surface of the first optical element.

38. The light converging optical system of claim 33, wherein a multi-layered film with wavelength selectivity is applied on at least one optical surface among optical surfaces of the objective optical element and the first optical element and the wavelength selectivity of the multi-layered film allows a light flux with a wavelength of λ1 and a light flux with a wavelength of λ2 to pass through and reflects a light flux with a wavelength of λ3 so as not to converge onto a information recording surface of the third optical information recording medium.

39. The light converging optical system of claim 33, wherein the optical pickup apparatus comprises a hologram-equipped laser unit in which an optical detector and the second light source are incorporated in one body, and a light flux with a wavelength of λ2 is reflected on the information recoding surface of the second information recording medium, proceeds on a homeward optical path to a hologram element in the hologram-equipped laser unit along the same optical path on the outward optical path, is changed the proceeding direction by the hologram element and enters an optical detector.

40. The light converging optical system of claim 25, wherein the objective optical element satisfies the following formulas:

m1=0 m2≠0 m3≠0 where m1 is an optical magnification for a light flux with a wavelength λ1, m2 is an optical magnification for a light flux with a wavelength λ2, and m3 is an optical magnification for a light flux with a wavelength λ3.

41. The light converging optical system of claim 40, which the following formula is satisfied:

m2=m3.

42. The light converging optical system of claim 41, wherein the second and third optical sources are united into one element.

43. The light converging optical system of claim 40, wherein the optical pickup apparatus comprises a hologram-equipped laser unit in which an optical detector and the third light source are incorporated in one body, and a light flux with a wavelength of λ3 is reflected on the information recoding surface of the third information recording medium, proceeds on a homeward optical path to a hologram element in the hologram-equipped laser unit along the same optical path on the outward optical path, is changed the proceeding direction by the hologram element and enters an optical detector.

44. The light converging optical system of claim 40, which the light converging optical system is used in an optical pickup apparatus which enables to reproduce and/or record information on the first optical information medium having a protective substrate with a thickness of t1, a first information recording surface and a second information recording surface which are laminated in this order from the light source side along the optical axis.

45. The light converging optical system of claim 25, wherein a distance on the optical axis from an optical information recording media side optical surface of the objective optical element to a surface of the protective substrate on the first optical information recording medium is 1 mm or more.

46. The light converging optical system of claim 25, wherein a focal length of a composite system composed of the objective optical lens and the first optical element for a light flux with a wavelength of $\lambda 1$ is in the range from 2.0 mm to 4.0 mm.

47. The light converging optical system of claim 25, further comprising an optical element having a chromatic aberration correction function for correcting chromatic aberration in such a way that when the wavelength of a light flux emitted from the second light source varies by 1 nm from $\lambda 2$, the phase difference giving structure corrects a varied aberration quantity at the same position on the optical axis before and after the wavelength variation to 0.03 $\lambda$ rms or less and the optical element is arranged on an optical path of a light flux with a wavelength of $\lambda 2$ and out of an optical path of a light flux with a wavelength of $\lambda 1$.

48. The light converging optical system of claim 25, wherein the phase difference giving structure comprises a serrated diffractive ring-shaped zones or a stepped structure in which a plurality of ring-shaped zones are formed around the optical axis and neighboring ring-shaped zones of the plurality of ring-shaped zones are jointed through a step almost parallel to the optical axis, and wherein the number of the diffractive ring-shaped zones or the number of the steps in the stepped structure is in a range from 15 to 30.

49. The light converging optical system of claim 25, wherein the objective optical element and the first optical element have different Abbe constants for a light flux with a wavelength of $\lambda 1$.

50. The light converging optical system of claim 25, wherein the objective optical element and the first optical element have the same Abbe constant for a light flux with a wavelength of $\lambda 1$.

51. The light converging optical system of claim 49, wherein a material of at least one of the objective optical element or the first optical element is a plastic material.

52. The light converging optical system of claim 25, wherein a relative position between the objective optical element and the first optical element is changeable when the optical pickup apparatus is driven.

53. The light converging optical system of claim 25, wherein a relative position between the objective optical element and the first optical element is not adapted to be changeable when the optical pickup apparatus is driven.

54. The light converging optical system of claim 53, wherein the objective optical element and the first optical element are physically connected to each other.

55. The light converging optical system of claim 53, wherein a distance on the optical axis from a light source side optical surface of the first optical element to an optical information recording medium side optical surface of the objective optical element is 3 mm or less.

56. The light converging optical system of claim 1, wherein the phase difference giving structure is a diffractive structure which converges a n-th (n is a natural number of 4 or more) order diffracted light flux ray caused by the diffractive structure onto the information recording surface on the first optical information recording medium.

57. The light converging optical system of claim 56, wherein the diffraction order n is from 5 to 10.

58. The light converging optical system of claim 57, wherein the diffraction order n is 5 or 8.

59. The light converging optical system of claim 58, wherein the diffraction order n is 5.

60. The light converging optical system of claim 58, wherein the diffraction order n is 8.

* * * * *